(12) United States Patent
Kilcher et al.

(10) Patent No.: US 10,067,344 B2
(45) Date of Patent: Sep. 4, 2018

(54) VARIABLE TRANSMISSIVITY VIRTUAL IMAGE PROJECTION SYSTEM

(71) Applicant: INTEL CORPORATION, Santa Clara, CA (US)

(72) Inventors: Lucio Kilcher, Montreux (CH); Nicolas Abele, Lausanne (CH); Patrick Gerard McGlew, Romainmotier (CH); Michel Combes, Denges (CH)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/201,357

(22) Filed: Jul. 1, 2016

(65) Prior Publication Data

US 2018/0003966 A1    Jan. 4, 2018

(51) Int. Cl.
| | |
|---|---|
| G02F 1/01 | (2006.01) |
| G02F 1/03 | (2006.01) |
| G02B 27/01 | (2006.01) |
| G02B 5/20 | (2006.01) |
| G02F 1/15 | (2006.01) |
| G02B 5/23 | (2006.01) |
| G02B 27/00 | (2006.01) |

(52) U.S. Cl.
CPC ......... *G02B 27/0101* (2013.01); *G02B 5/208* (2013.01); *G02B 5/23* (2013.01); *G02B 27/0093* (2013.01); *G02B 27/0172* (2013.01); *G02F 1/0126* (2013.01); *G02F 1/0147* (2013.01); *G02F 1/15* (2013.01); *G02B 2027/0118* (2013.01); *G02B 2027/0178* (2013.01)

(58) Field of Classification Search
CPC ........ G02F 1/0147; G02F 1/15; G02F 1/0126; G02B 27/0101; G02B 27/0172; G02B 5/23; G02B 5/208; G02B 27/0093; G02B 2027/0178; G02B 2027/0118
USPC .......... 359/244, 241, 240, 265–275; 345/105
See application file for complete search history.

(56) References Cited

U.S. PATENT DOCUMENTS

| | | | |
|---|---|---|---|
| 6,130,772 A | 10/2000 | Cava | |
| 2008/0218434 A1* | 9/2008 | Kelly | G02B 27/01 345/8 |
| 2011/0240834 A1* | 10/2011 | Baudou | G02B 27/01 250/214 AL |
| 2012/0235900 A1* | 9/2012 | Border | G02B 5/23 345/156 |
| 2012/0242678 A1 | 9/2012 | Border et al. | |
| 2013/0113973 A1 | 5/2013 | Miao | |
| 2015/0260991 A1 | 9/2015 | Bhardwaj et al. | |
| 2015/0370075 A1 | 12/2015 | Ato et al. | |

(Continued)

OTHER PUBLICATIONS

International Search Report received for PCT Patent Application No. PCT/US2017/035644, dated Jul. 31, 2017, 5 pages.

*Primary Examiner* — Tuyen Tra

(57) ABSTRACT

Disclosed herein are apparatus, devices, and methods to provide a modified-transmissivity zone on a projection surface used to generate a virtual image superimposed onto a real-world view. In particular, a variable-transmissivity material may be provided in the projection surface. The transmissivity of variable-transmissivity material may be modified responsive to application of a stimulus. A stimulus source may be configured to selectively apply a stimulus to the variable-transmissivity material to generate a discrete modified-transmissivity zone on the projection surface.

24 Claims, 9 Drawing Sheets

(56) References Cited

U.S. PATENT DOCUMENTS

2017/0184894 A1* 6/2017 Hayashi .............. G02F 1/13318
2017/0323615 A1* 11/2017 Hazra ................ G02B 27/0172

* cited by examiner

VARIABLE TRANSMISSIVITY VIRTUAL IMAGE PROJECTION SYSTEM

TECHNICAL FIELD

Embodiments herein generally relate to heads-up displays and in particular to systems for generating virtual images in a see-through heads-up display.

BACKGROUND

A heads-up display (HUD) can be implemented to provide a virtual image (e.g., images, text, or the like) superimposed onto a real world view. Common applications of HUDs include defense, transportation, industrial, entertainment, wearable devices, or the like.

In some HUD displays, the virtual image may be presented to a user by reflecting the virtual image off of a projection surface into a user's eye. The projection surface may be transparent to allow the user to view a real world scene simultaneously with the virtual image. Accordingly, ambient light from outside of the HUD is also incident on the user's eye. The brightness and/or the uniformity of the brightness of the ambient light may affect the ability of the user to see the virtual image.

DETAILED DESCRIPTION

Figure 1:
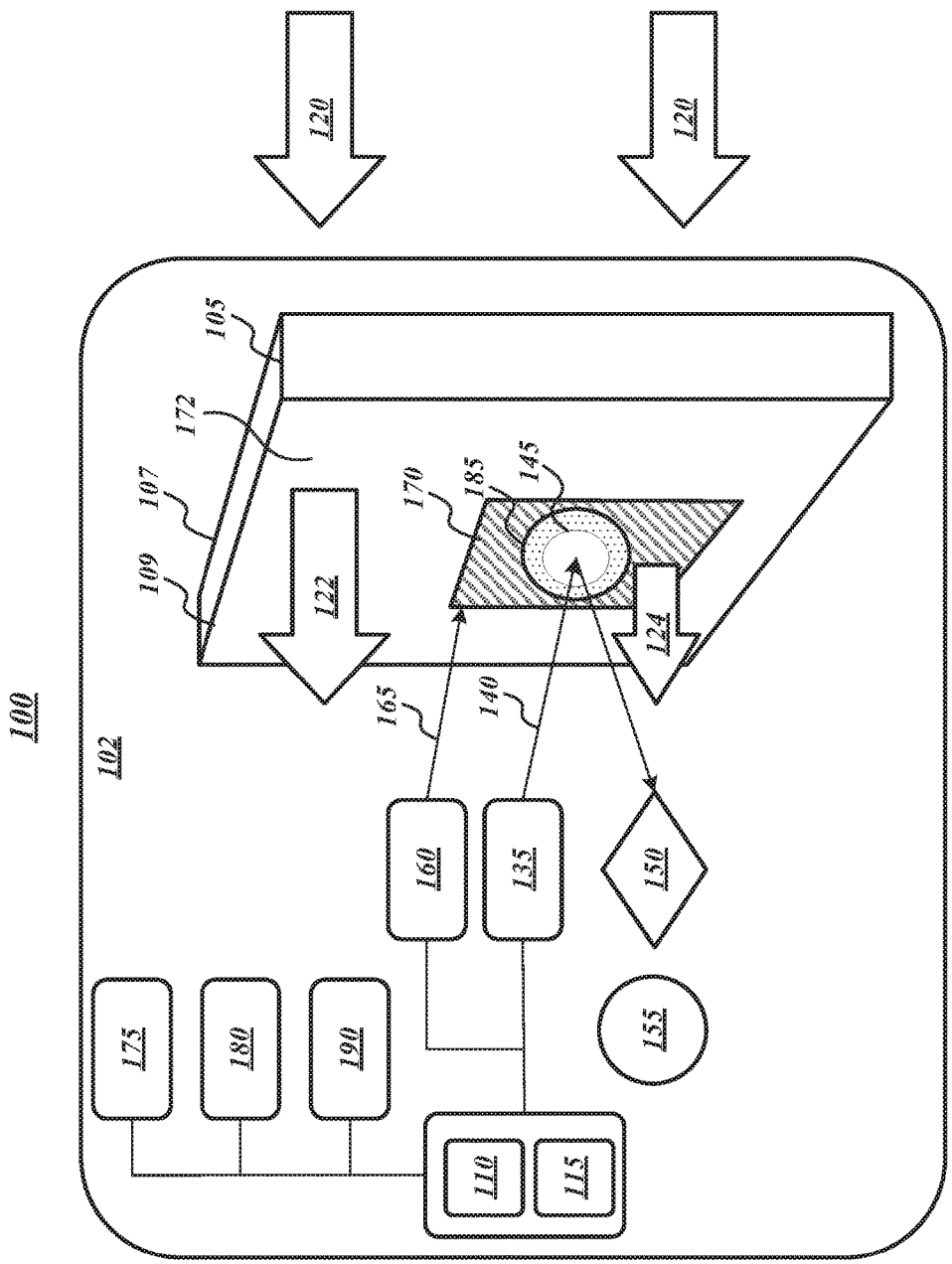
FIG. 1 depicts a block diagram of an illustrative virtual image projection system according to a first embodiment.

Various embodiments may be generally directed to virtual image presentation systems. Specifically, the present disclosure may be applicable to heads-up display (HUD) virtual image presentation systems having a transparent projection surface for projecting a virtual image superimposed onto a real-world scene visible through the projection surface.

For example, the present disclosure can be implemented as a HUD having a projection system and a projection surface. The projection surface may include an external side facing the external environment and an internal side facing a user. The projection surface may be transparent, substantially transparent, and/or semi-transparent ("transparent," "light transmissive," "see-through," or the like) to allow ambient light incident on the external side to pass through to a user's eye that is facing the internal side. In this manner, a user may see a real-world scene through the projection surface of the HUD. The projection system may scan light corresponding to pixels of a virtual image onto a projection zone on the internal side of the projection surface. The projection surface may include one or more layers (or lenses) configured to reflect at least a portion of the scanned light back to the user's eye to generate the virtual image. Accordingly, a user may be able to see the virtual image superimposed onto the real-world view.

The projection surface may include a variable-transmissivity material configured to modify the ability of light to be transmitted through the projection surface (i.e., transmissivity). The variable-transmissivity material may modify the transmissivity of the projection surface responsive to an application of a stimulus. Non-limiting examples of a stimulus may include light, heat, sound waves, an electric current, a magnetic force, or the like. During operation, as the light is scanned across the projection zone, a stimulus source may apply the stimulus to a portion of the variable-transmissivity material to generate a modified-transmissivity zone on the projection surface. The modified-transmissivity zone may have a decreased transmissivity compared with the non-modified transmissivity of the projection surface outside of the modified-transmissivity zone (i.e., a non-modified zone). Accordingly, the brightness of the ambient light reaching the user's eye through the projection surface may be selectively controlled by the HUD. The modified-transmissivity zone may be located based on various factors, including, without limitation, a location of the projection zone, user eye gaze location, a location of the virtual image, brightness of ambient light incident on the projection surface, and/or the like. As such, the HUD may adjust the transmissivity of the projection surface to compensate for ambient light conditions.

Superimposing a virtual image onto a real-world view is challenging, particularly in bright and/or non-uniform brightness environments. For example, a surface of a building in a real-world view that is directly illuminated by the sun will be brighter compared to an adjacent structure in the shadow of the building. Conventional solutions for providing virtual images under such conditions include increasing the brightness of the virtual image, for example, by increasing the intensity of the source light, or using photochromic lenses that change transmissivity when exposed to ultraviolet (UV) light. Increasing the intensity of the image source light requires increased power, is ineffective above certain brightness levels, and does not address non-uniform brightness environments. The use of photochromic lenses causes an entire viewing lens to be darkened, even though only a portion of the real-world view involves bright light and/or a superimposed image, ultimately leading to an uneven and/or distorted virtual image overlaid onto a real-world view. Accordingly, the described technology generally relates to virtual image presentation systems capable of dynamically modifying the transmissivity of discrete areas or zones of a projection surface thereof. In this manner, embodiments of the described technology may selectively compensate for bright ambient light and/or ambient light of non-uniform brightness while providing a distinct virtual image superimposed on a real-world view.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of an illustrative virtual image projection system according to a first embodiment. More specifically, FIG. 1 depicts a virtual image projection system 100 for projecting a virtual image superimposed over a real-world view according to some embodiments. In one embodiment, the virtual image projection system 100 may be implemented as a processor-based system that includes a device 102 having a processor circuit 110 (for example, controller 530 depicted in FIG. 5) operably coupled to a memory unit 115. Although one processor circuit 110 and one memory unit 115 are depicted in FIG. 1, embodiments may include a plurality of processor circuits 110 and/or memory units 115. In some embodiments, the device 105 may not include a processor circuit 110 and/or memory unit 115. In some embodiments, the device 102 may receive control instructions from a remote computing device (not shown) having a processor circuit 110 and/or memory unit 115.

In some embodiments, the device 102 may have installed a control application for controlling various aspects of the device 102 according to some embodiments described herein. In some embodiments, the control application may include a plurality of applications and/or modules, such as a transmissivity application or module configured to control the transmissivity of the projection surface 105 and/or a virtual image application or module configured to control the device 102 to generate a virtual image 155. In some embodiments, the transmissivity application and/or the virtual image application may be stand-alone applications. The control application, transmissivity application or module, and/or virtual image application or module may be configured to communicate with each other, including, without limitation, sharing data, providing instructions, or the like. The memory unit 115 may store an unexecuted version of the control application, transmissivity application or module and/or the virtual image application or module and/or one or more data units used for controlling various aspects of the device 102.

The device 102 may be implemented in various forms including, without limitation, a HUD, a head-worn display (HWD), glasses, binoculars, a monocular device (e.g., scope, or the like), goggles, a windshield, a window, a helmet, a visor, a wearable device, or the like. Embodiments are not limited in this context. Although the virtual image projection system 100 shown in FIG. 1 has a limited number of elements in a certain topology, it may be appreciated that the virtual image projection system 100 may include more or less elements in alternate topologies as desired for a given implementation.

As shown in FIG. 1, the device 102 may include a projection surface 105 having an external side 107 and an internal side 109. The external side 107 may be configured to face the external environment to receive ambient (or environmental) light 120, for example, such as light from the sun or an artificial light source. The projection surface 105 may be transparent to allow ambient light 122, 124 to pass through the projection surface 105 and enter the eye 155 of a user, thereby allowing the user to see a real-world view of objects external to the device 102 through the projection surface 105. Although one projection surface 105 is depicted in FIG. 1, embodiments may include a plurality of projection surfaces 105.

Figure 4A:
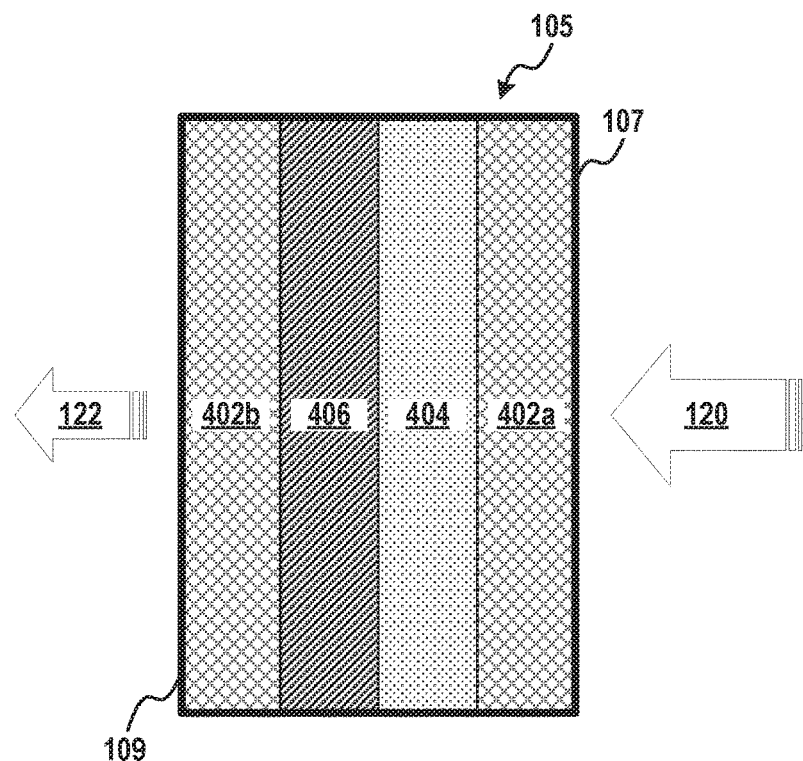
FIG. 4A depicts a block diagram of illustrative projection surface according to a first embodiment.
Figure 4B:
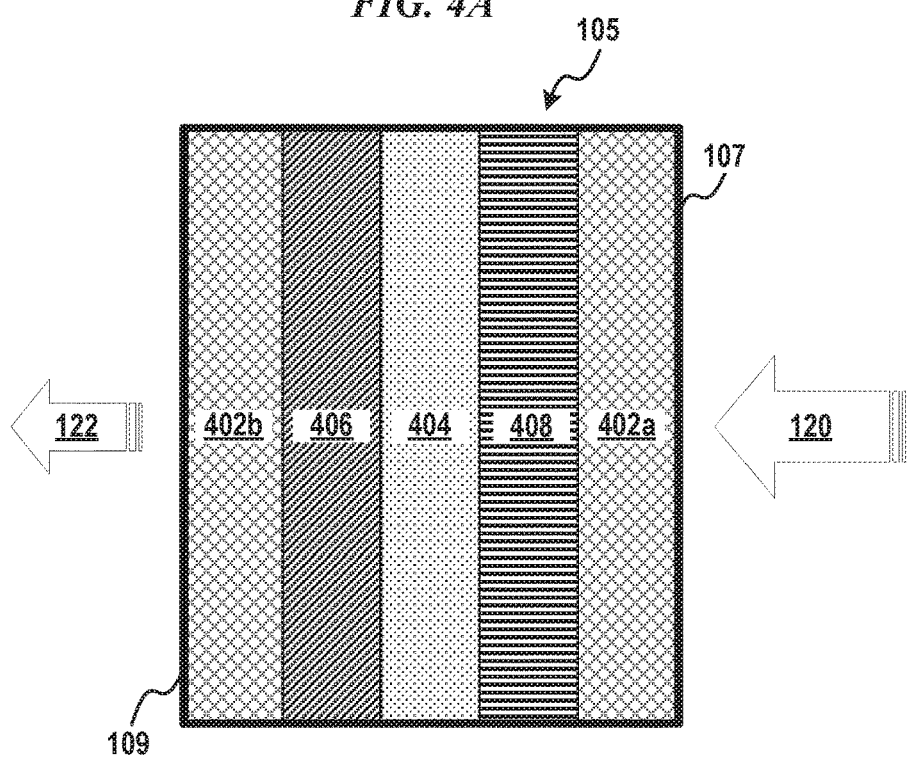
FIG. 4B depicts a block diagram of illustrative projection surface according to a second embodiment.

The projection surface 105 may include various materials arranged in one or more layers, films, coatings, and/or lenses (see, for example, FIGS. 4A-4B). For example, the projection surface 105 may include one or more lenses, optical or polymer layers, variable-transmissivity materials, light-directing layers, light filters, or the like. The optical layer may be configured to protect the eye of a user, protect the other layers of the projection surface 105, and/or provide a substrate for other layers of the projection surface 105. In some embodiments, the optical layer may be formed from an at least partially transparent material, including, without limitation, polymers, pre-polymers, optical polymers, urethane, polycarbonate, polystyrene, allyl diglycol carbonate, glass, optical glass, and Trivex®.

The variable-transmissivity material may be configured to modify the transmissivity, or the ability of light to pass through an object, of the projection surface 105. In some embodiments, the variable-transmissivity material may be embedded within another layer of the projection surface 105. For example, the variable-transmissivity material may be embedded in an optical layer of the projection surface 105. The variable-transmissivity material may be included in the projection surface 105 in various forms, including, without limitation, dyes, crystals, films, lenses, coatings, or the like. In some embodiments, the variable-transmissivity material may operate by undergoing a reversible transformation in transmissivity in response to a stimulus. For example, a variable-transmissivity material may include a chemical species that changes from a first form to a second form in response to the stimulus. This change in form of the chemical species may modify the absorption spectra of the variable-transmissivity material to photo-irradiation, thereby modifying the transmissivity of the material. Accordingly, the transmissivity of the projection surface 105 may be modified by applying the stimulus to the variable-transmissivity material of the projection surface 105. In some embodiments, the device 102 may change the transmissivity of the projection surface only within one or more modified-transmissivity zones 170. As such, specific portions of the projection surface 105 may be colored, tinted, shaded, darkened, or otherwise modified to reduce or completely eliminate the ability of light to pass through portions of the projection surface 105 within the modified-transmissivity zone 170. In some embodiments, the projection surface 105 may include one or more non-modified zones 172 in which the transmissivity of the projection surface 105 has not been modified. Accordingly, the transmissivity of certain zones of the projection surface 105 may be modified while the transmissivity of the remainder of the projection surface is not modified.

The variable-transmissivity material may operate according to various techniques. For example, the variable-transmissivity material may include a material configured to change transmissivity in response to a stimulus 165 applied to the variable-transmissivity material by a stimulus source 160. Non-limiting examples of variable-transmissivity materials may include photochromic materials that change color in response to light, thermochromic materials that change color in response to temperature, electrochromic materials that change color in response to an electrical stimulus (e.g., voltage, current, or the like), and materials that change color in response to other stimuli, including, without limitation, sound waves (e.g., ultrasound waves), magnetic forces, or the like.

Non-limiting examples of photochromic materials include, without limitation, inorganic salts, silver, spiropyran, spirobenzopyran, benzopyran, naphthopyran, spiroxazine, fulgide, fulgimide, dithienylethene, azobenzene, azulene, stilbene, chromene, diarylethene, photoinitiators, derivatives thereof, alloys thereof, salts thereof, and combinations thereof. Non-limiting examples of thermochromic materials include, without limitation, leuco dyes, spirolactones, spiropyrans, fluorans, fulgides, thermochromic liquid crystals, cholesteryl nonanoate, and cyanobiphenyls. Non-limiting examples of electrochromic materials include, without limitation, transition metal oxides, tungsten oxide, nickel oxide, polyaniline, pollythiophene, polyoxotungstate, polyoxometallates, viologens, indium tin oxide, metal hydrides, metallohexacyanate, niobium pentoxide, molybdenum trioxide, Iridium oxide (or Iridium Sesquioxide), metallophthalocyanine, metal hexacyanometallates, liquid crystal materials, derivatives thereof, alloys thereof, salts thereof, and combinations thereof. In some embodiments, the variable-transmissivity material may be formed of liquid crystal materials formed as a liquid crystal display (LCD), a polymer-dispersed LCD (PDLC), or the like. In some embodiments, the liquid crystal materials may be formed as a layer or lens of the projection surface 105. In some embodiments, the liquid crystal materials may be formed as a film configured to coat at least a portion of the projection surface 105.

In some embodiments, a change in transmissivity may include a change in color of the variable-transmissivity material and, therefore, the projection surface 105. In some embodiments, a change in transmissivity may be reversed or removed responsive to removal of the stimulus. Accordingly, in some embodiments, a variable-transmissivity material may include a chemical species that changes from a first form to a second form responsive to a stimulus, and the chemical species changes back to the first form responsive to removal of the stimulus. The reversal (for example, the chemical species changing from the second form back to the first form) may occur instantaneously or substantially instantaneously with removal of the stimulus or after a period of time following removal of the stimulus (e.g., a "reversion time period" or "persistence time period"). In some embodiments, the persistence time period of the variable-transmissivity period may be selected to be at least longer than one frame of a virtual image. Accordingly, a single application of a stimulus may persist for multiple frames of the virtual image, thereby decreasing the power and resources required to maintain a modified-transmissivity zone 170. In some embodiments, a change in transmissivity may decrease over time (e.g., "fade away") following removal of the stimulus.

In some embodiments, a change in transmissivity may be modified by application of a one or more other stimuli. For example, a variable-transmissivity material may include a chemical species that changes from a first form to a second form responsive to light having a first wavelength, and the chemical species may change from the second form back to the first form (or to a third form) responsive to light having a second wavelength that is different from the first wavelength. In another example, a variable-transmissivity material may be configured to change from a first form to a second form responsive to a first electrical signal (e.g., a first voltage) and from the second form to the first form (or to a third form) responsive to a second electrical signal (e.g., a second voltage) that is different than the first electrical signal. Accordingly, in some embodiments, a change in transmissivity due to a first stimulus may be maintained until removal of the first stimulus and/or an application of a second stimulus.

In some embodiments, the transmissivity of the projection surface 105 may have two states or levels. For example, the projection surface 105 may have an inactive (i.e., "normal," "bleached," "clear," "transparent," or "transmissive") state that occurs in the absence of a stimulus. The projection surface 105 may have an active state that occurs responsive to application of the stimulus. A higher amount (i.e., luminous intensity) of ambient light 122 may be allowed to pass through the projection surface 105 when the projection surface 105 is in the inactive state compared to the amount of ambient light 124 allowed to pass through the projection surface 105 when the projection surface 105 is in the active state. For example, the projection surface 105 may experience a transmissivity reduction of about 0.25%, about 0.5%, 1%, about 5%, about 10%, about 20%, about 30%, about 40%, about 50%, about 60%, about 70%, about 80%, about 90%, about 100% (no transmissivity), or any range between any two of these values (including endpoints) when the projection surface 105 is in the active state compared with the transmissivity of the projection surface 105 in the inactive state. Accordingly, as shown in FIG. 1, a greater amount of ambient light 122 may pass through a non-modified zone 172 compared with the amount of ambient light 124 passing through a modified-transmissivity zone 170.

In some embodiments, the transmissivity of the projection surface 105 may be set at variable levels based on the application of the stimulus (for example, a transmissivity value between a maximum transmissivity value and a minimum transmissivity value). For instance, the transmissivity of a projection surface 105 having an electrochromic material may be decreased by increasing a voltage applied to the electrochromic material (down to a minimum transmissivity value) and vice versa. In another instance, the transmissivity of a projection surface 105 having a photochromic material may be decreased by increasing the intensity of a light stimulus and/or increasing the exposure time of the photochromic material to the light stimulus. In another instance, the transmissivity of the projection surface 105 having a thermochromic material may be decreased by increasing the temperature of the thermochromic material and/or increasing the exposure time of the thermochromic material to a heat stimulus.

In some embodiments, the device 102 may be configured to generate a plurality of modified-transmissivity zones 170. In some embodiments in which the projection surface 105 includes a plurality of modified-transmissivity zones 170, at least a portion of the modified-transmissivity zones 170 may have different levels of transmissivity. In some embodiments in which the projection surface 105 includes a plurality of modified-transmissivity zones 170, the modified-transmissivity zones 170 may have the same or substantially the same levels of transmissivity. In some embodiments, the plurality of modified-transmissivity zones 170 may be separate, non-overlapping areas on the projection surface 105. In some embodiments, at least a portion of the plurality of modified-transmissivity zones 170 may be touching or overlapping. In some embodiments, a modified-transmissivity zone 170 may cover the entire or substantially the entire projection surface 105 such that the projection surface 105 does not include a non-modified zone 172.

In some embodiments, the projection surface 105 may include a light-directing optical element (e.g., layer or lens)

to direct light to one or more viewpoints, for instance, the eye 155 of a user (e.g., proximate to a user's eye, proximate to where a user's eye would or should be during operation, or the like). For example, the device 102 may include a light projector 135 configured to project light 140 corresponding to an image onto the projection surface 105. The light 140 may be formed of a plurality of light waves or light beams. Although one light projector 135 is depicted in FIG. 1, embodiments may include a plurality of light projectors 135. During operation, the light-directing lens may direct the light 140, for example, by reflecting the light at one or more angles, to generate a virtual image 150 visible to the eye 155 superimposed or overlaid onto the projection surface 105 (and, therefore, superimposed or overlaid over the real-world view visible through the projection surface 105). In some embodiments, the light-directing lens may redirect the light 140 scanned across the projection surface 105 to project the virtual image 155 at a viewpoint and also allow ambient light 122, 124 to pass through from the external environment to the viewpoint. As such, virtual images and real world images may be viewed simultaneously.

In some embodiments, the light-directing lens may include a holographic optical element and/or diffractive optics. In some embodiments, the light-directing portion may include a holographic combiner lens. In one example, the holographic combiner lens may include a transparent substrate with a photosensitive material (e.g., a photopolymer, a diochromatic gelatin, or the like) coated thereon. In another example, the holographic combiner lens may include an opaque substrate with a photosensitive material (e.g., a photopolymer, a diochromatic gelatin, or the like) coated thereon. The photosensitive material may be etched, for example, using a holographic recording process to provide reflective portions or reflective features. With some examples, a protective layer and/or material may be coated onto the photopolymer, for example, after it has been holographically recorded. In some embodiments, the light-directing lens may include optical materials such as a volume hologram material and/or a diffraction grating.

In some embodiments, the device 102 may include one or more brightness (or ambient light) sensors 190 to measure the amount, intensity, brightness, or the like of the ambient light 120 external to the device 100 and/or the brightness of the ambient light 122, 124 that has passed through the projection surface 105. The one or more brightness sensors 190 may generate brightness information associated with the external ambient light 120 and/or the internal ambient light 122, 124. The brightness information may indicate and/or be a measurement of the brightness of the external ambient light 120 and/or the internal ambient light 122, 124. In some embodiments, the brightness information may be used by the device 102 to determine a brightness differential information of the ambient light 120 and/or the ambient light 122, 124 as a measure of non-uniform brightness conditions on discrete areas of the projection surface. For example, the projection surface 105 may be divided into a plurality of areas and brightness information may be provided for at least a portion of the plurality of areas. The device 102 may compare the brightness of the external ambient light 120 and/or the internal ambient light 122, 124 associated with each of the plurality of areas to determine the brightness differential information. The brightness information and/or brightness differential information may be transmitted to the processor circuit 110 and/or stored in the memory 115, for example, for use by the control application.

In some embodiments, a change in the transmissivity of the projection surface 105 may be initiated and/or performed based on the brightness information and/or the brightness differential information. For instance, the device 102 may cause a change in transmissivity of the projection surface 105 responsive to the brightness of the ambient light 120 and/or the ambient light 122, 124 being above a threshold level based on the brightness information. In another instance, a level of transmissivity of the projection surface 105 may be based on the brightness information (i.e., the brighter the ambient light 120 and/or the ambient light 122, 124 the lower the transmissivity level of a modified-transmissivity zone 170 and vice versa). In a further instance, the device 102 may cause a change in transmissivity of the projection surface 105 responsive to the brightness differential of one or more areas of the projection surface 105 being above a threshold level based on the brightness differential information.

The device 102 may include an eye gaze tracker 175 to monitor the point of gaze of the eye 155. The eye gaze tracker 175 may provide real-time and/or substantially real-time information indicating the point of gaze of a user interfacing with the device 102. The eye gaze tracker 175 may generate eye gaze information that may be transmitted to the processor circuit 110 and/or stored in the memory 115, for example, for use by the control application. A head position tracker 180 may be used to monitor the position of the head of a user interfacing with the device 102. The head position tracker 180 may generate head position information that may be transmitted to the processor circuit 110 and/or stored in the memory 115, for example, for use by the control application. The device 102 may use the eye gaze information and/or the head position information to determine an eye gaze location 185 of the eye 155 on the projection surface 105. The eye gaze location 185 may indicate an area of the projection surface 105 that is being looked at by the user (i.e., user focal point on the projection surface 105). In some embodiments, the device 102 may specifically determine the brightness of light at the eye gaze location 185 for use in generating a modified-transmissivity zone according to some embodiments.

During operation, the device 102 may be configured to provide one or more virtual images 150 at one or more viewpoints superimposed on a real-world view observed by the eye 155 through the projection surface 105. The processor 115 may execute a control application (and/or virtual image application or module) operable to instruct a light projector 135 to project light 140 corresponding to an image on the projection surface 105. The light projector 135 may include various light projection elements. In some examples, the light projector 135 may include a scanning mirror or panel microdisplay projector to project the light 140 onto the projection surface 105. In general, the light projector 135 may include a power source, a light source, and a projection system. In some examples, the power source may be a battery. In some embodiments, the light source may be a laser light source, a light emitting diode (LED) light source, or in general, any light source configured to emit light. In some embodiments, the light projector 135 may include a micropanel projector. In some embodiments, the light projector 135 may include a microelectromechanical system (MEMS) based scanning mirror projection system. In some embodiments, the light projector 135 may include a digital light processing (DLP) based projection system. In some embodiments, the light projector 135 may include one or more of a signal processing component, a signal interface component, and a graphics processing component to project light onto the projection surface 105 to project a virtual image at a viewpoint.

During operation of the device 102, the light projector 135 may direct the light 140 toward a projection zone 145 on the projection surface 105. The light-directing lens of the projection surface 105 may cause at least a portion of the light 140 to be redirected to generate the virtual image 150 at a viewpoint. The eye 155 may view the virtual image 150 superimposed onto a real-world view. In some embodiments, the projection zone 145 may be determined based on the eye gaze information, the head position information, and/or the eye gaze location 185.

During operation of the device 102, the control application (and/or transmissivity application or module) may direct a stimulus source 160 to apply a stimulus 165 to at least a portion of the variable-transmissivity material of the projection surface 105 to generate a modified-transmissivity zone 170 having various properties on the projection surface 105. The properties of the modified-transmissivity zone 170 may include, without limitation, location, size (e.g., zone area), duration, transmissivity reduction amount, color, or the like. In some embodiments, the control application may dynamically modify properties of a modified-transmissivity zone 170, for example, based on various information as described herein.

The stimulus 165 used to generate a modified-transmissivity zone 170 may include various forms, including, without limitation, light, sound, heat, electrical signals, magnetic forces, or the like. In general, the stimulus 165 may be selected based on a reaction required to change the transmissivity of the variable-transmissivity material of the projection surface 105. In an embodiment in which the variable-transmissivity material includes a photochromic material, a light stimulus source 165 may provide a light stimulus 165 having a wavelength that causes a change in the transmissivity of the photochromic material. For instance, the stimulus 165 may include ultraviolet (UV) light and the transmissivity of the variable-transmissivity material may change in response to UV light. Non-limiting examples of a light stimulus 165 may include UV light (e.g., light having a wavelength of about 10 nanometers (nm) to about 400 nm), visible light (e.g., light having a wavelength of about 400 nm to about 700 nm), and infrared (IR) light (e.g., light having a wavelength of about 700 nm to about 1 millimeter (mm)). In some embodiments, a stimulus source 160 for a light stimulus 165 may include, without limitation, a laser light source, an LED light source, or in general, any light source configured to emit light.

In an embodiment in which the variable-transmissivity material includes an electrochromic material, an electrical stimulus source 165 may provide an electric signal stimulus 165 that causes a change in the transmissivity of the electrochromic material. For instance, the stimulus 165 may include a voltage and the transmissivity of the variable-transmissivity material may change in response to an applied voltage. In another instance, the variable-transmissivity material may include an LCD film arranged on at least a portion of the projection surface 105 and the stimulus 165 may include an electric current applied to the LCD film via an electrical stimulus source 160. In an embodiment in which the variable-transmissivity material includes an LCD material, the LCD material may be formed of a plurality of cells. The device 102 may selectively apply the stimulus 165 to the individual cells to form the modified-transmissivity zone 170.

In embodiments in which the variable-transmissivity material includes a thermochromic material, a thermal stimulus source 160 may be configured to apply a thermal stimulus 165 to the variable-transmissivity material. A non-limiting example of a thermal stimulus source 160 may include a laser configured to apply a heat stimulus 165 to the variable-transmissivity material.

Although FIG. 1 depicts the light projector 135 and the stimulus source 160 as being separate elements, embodiments are not so limited. For example, the light projector 135 may include the stimulus source 160 (see, for example, FIG. 3). For instance, the stimulus source 160 may be a UV light source arranged within a light projector 135 configured to project red, green, and blue ("RGB") light 140. In some embodiments, the light projector 135 may be a stimulus source 160. For instance, the stimulus 165 may be visible light, such as red light (e.g., light having a wavelength of about 620 nm to about 750 nm), and the light projector 135 may project RGB light 140. Accordingly, the light projector 135 may also operate as the stimulus source 160 because red light in the RGB light 140 used to form the virtual image 150 also operates as the stimulus 165.

In some embodiments, the device 102 may direct the stimulus source 160 to generate the modified-transmissivity zone 170 during the display of a virtual image 155. In some embodiments, the device 102 may direct the stimulus source 160 to generate the modified-transmissivity zone 170 during the display of a virtual image 155 based on one or more factors. Illustrative and non-limiting examples of factors may include the brightness of the external ambient light 120 and/or internal ambient light 122, the brightness differential (e.g., non-uniform brightness) of the external ambient light 120 and/or internal ambient light 122, user-specified settings, and aspects of the virtual image 155, such as the brightness and/or the colors of the virtual image 155. For example, the device 102 may generate a modified-transmissivity zone 170 responsive to the brightness of the external ambient light 120 and/or internal ambient light 122 being above a threshold amount. In another example, the device 102 may generate a modified-transmissivity zone 170 to compensate for a non-uniform brightness environment by reducing the transmissivity of areas of the projection surface 105 exposed to higher intensity ambient light 120. For instance, the control application may determine a brightness differential of areas of the projection surface 105 based on the brightness information and may generate one or more modified-transmissivity zones 170 in areas where the brightness differential is above a threshold value. For example, light having a first luminous intensity may be incident on a first area of the projection surface 105 (e.g., direct sunlight) and light having a second luminous intensity that is less than the first luminous intensity (e.g., indirect sunlight or light from a shaded object) may be incident on a second area of the projection surface. The device 102 may be configured to generate a modified-transmissivity zone 170 on the first area in order to reduce the transmissivity of (e.g., "dim" or "darken") the first area. Accordingly, the device 102 may operate to provide uniform or substantially uniform brightness to a user.

In a further example, the device 102 may generate a modified-transmissivity zone 170 responsive to the brightness of the virtual image 155 being below a threshold value. Accordingly, the device 102 may reduce the power required to generate a brighter image via increasing the intensity of the light 140. In a still further example, the device 102 may generate a modified-transmissivity zone 170 responsive to the virtual image including certain colors, for example, yellow, that may be difficult to see superimposed over the ambient light 122. In yet a still further example, the device 102 may generate a modified-transmissivity zone 170 to highlight and/or provide contrast with aspects and/or colors of a virtual image 155 and/or a real-world view. For instance, the device 102 may generate a red or yellow non-transmissivity zone 170 to highlight a virtual image 155 and/or portions of the virtual image 155. In another instance, the device 102 may generate a modified-transmissivity zone 170 to highlight, cover, or otherwise delineate an object in the real-world view (e.g., form a darkened or yellow box around an object in the real-world view).

In some embodiments, the device 102 may generate and/or not generate a modified-transmissivity zone 170 responsive to user input (e.g., an IR sensor for hand gestures, audio input device, buttons, user-specified preferences, or the like). In some embodiments, the device 102 may generate a modified-transmissivity zone 170 responsive to one or more control signals from the virtual image application (or virtual image module of the control application). For example, the instructions for generating a virtual image 150 on the device 102 may include instructions for the device to generate a modified-transmissivity zone 170 according to some embodiments described herein.

In some embodiments, the modified-transmissivity zone 170 and/or the non-modified zone 172 may be associated with zone information. The zone information may provide instructions, data, or the like for generating a modified-transmissivity zone 170 or maintaining a non-modified zone 172. The zone information may specify properties of a modified-transmissivity zone 170. For example, the zone information may include, without limitation, location, size, duration, transmissivity level, color, stimulus, stimulus source, virtual image overlap (e.g., amount modified-transmissivity zone should extend beyond virtual image), projection surface for transmissivity zone (e.g., for multi-projection surface device), zone active/inactive information (e.g., a trigger indicating whether a specified modified-transmissivity zone should be generated), and/or the like. The control application (or transmissivity application or module) may use the zone information to control the generation of the modified-transmissivity zone 170. For instance, the zone information may specify that a modified-transmissivity zone 170 should be generated at location X, Y on the projection surface 105 having a size Z, for a duration of 30 seconds (or while a virtual image is being generated), and the modified-transmissivity zone 170 should reduce the transmissivity of the projection surface 105 by 20% (or provide a target luminous intensity of the ambient light 124). In another instance, the zone information may provide data and/or instructions that a modified-transmissivity zone 170 should not be generated in a certain area of the projection surface 105, for example, to maintain a non-modified zone 172.

In some embodiments, the device 102 may generate at least a portion of the zone information. In some embodiments, at least a portion of the zone information may be based on user-specified preferences. In some embodiments, the virtual image application may provide zone information to the control application for generating the modified-transmissivity zone 170. The zone information may be generated based on various information including, without limitation, projection zone information (e.g., location, size, duration, and/or the like of the projection zone), virtual image information (e.g., location, size, duration, colors, brightness, and/or the like of the virtual image), brightness information, brightness differential information, eye gaze information, head position information, eye gaze location 185, and/or the like. In some embodiments, at least a portion of the zone information may be used to ensure that a modified-transmissivity zone 170 is located, sized, and/or tinted appropriately for a virtual image 150. For example, the zone information may indicate where the modified-transmissivity zone 170 should be located such that the virtual image 150 is superimposed on the real-world view over the modified-transmissivity zone 170 (i.e., to reduce the brightness of the ambient light 124 incident on the eye 155 in the area where the virtual image 150 is generated). In another example, the transmissivity reduction of a modified-transmissivity zone 170 may be determined and/or dynamically modified based on the brightness of the external ambient light 120 and/or internal ambient light 122, 124 based on the brightness information.

In some embodiments, the projection surface 105 may include a plurality of variable-transmissivity materials. In some embodiments, the plurality of variable-transmissivity materials may be arranged in a plurality of layers, films, lenses, or the like. In some embodiments, the plurality of variable-transmissivity materials may be arranged in one layer, film, lens, or the like of the projection surface 105. In some embodiments, at least a portion of the plurality of variable-transmissivity materials may have different transmissivity modification characteristics. For example, certain of the plurality of variable-transmissivity materials may be configured to modify the transmissivity of the projection surface 105 by changing to different colors in response to a stimulus 165. For instance, a first variable-transmissivity material layer may be configured to change to yellow in response to a first stimulus 165 and a second variable-transmissivity material layer may be configured to change to magenta in response to a second stimulus 165. In another example, certain of the plurality of variable-transmissivity materials may be have a different duration of maintaining a modified state after removal of a stimulus a stimulus 165. In a further example, certain of the plurality of variable-transmissivity materials may experience a modification of transmissivity in response to different stimuli 165. For instance, a first variable-transmissivity material may undergo a transmissivity modification in response to an electric signal stimulus 165 (e.g., an LCD layer), and a second variable-transmissivity material may undergo a transmissivity modification in response to a light stimulus 165 (e.g., a photochromic material layer). In this manner, the device 102 may be configured to modify the transmissivity of select portions of the projection surface 105 using a plurality of transmissivity characteristics.

In some embodiments, the projection system 100 may include additional elements not shown in FIG. 1. Non-limiting examples of additional elements may include a power source, wireless communication elements (e.g., transceivers), user input elements (e.g., buttons, switches, audio command input elements, touchscreen elements, gesture input elements, or the like), video and/or still image cameras, video and/or still image displays, sensors (e.g., heat sensors, touch sensors, or the like), or the like.

Figure 2:
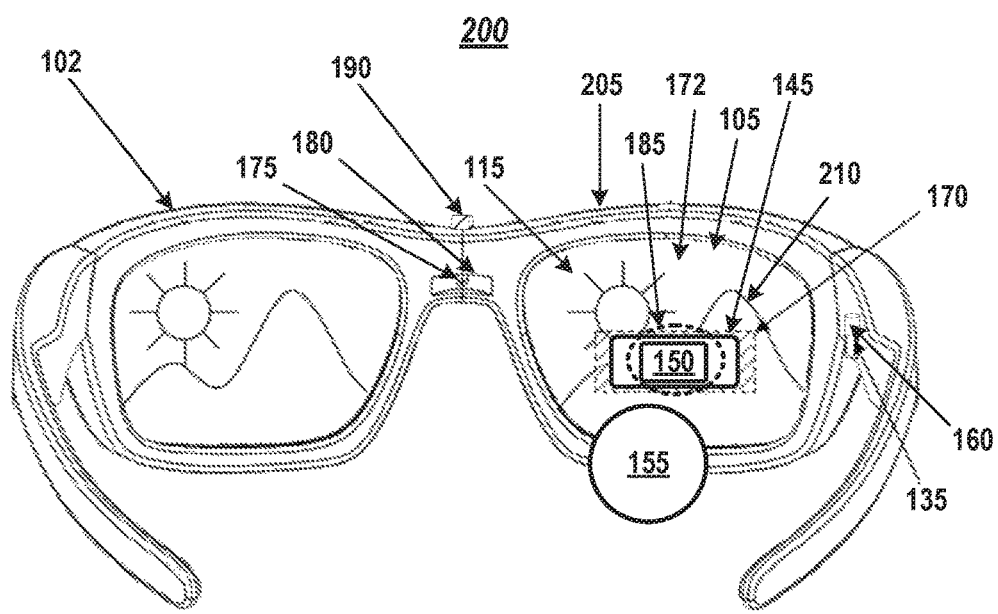
FIG. 2 depicts a block diagram of an illustrative virtual image projection system according to a second embodiment.

FIG. 2 depicts a block diagram of an illustrative virtual image projection system according to a second embodiment. More specifically, FIG. 2 illustrates an internal view of an example optical system 200 for projecting a virtual image at a viewpoint according to some embodiments. As shown in FIG. 2, a device 102 or at least a portion of a device 102 may be implemented as an optical system 200 in the form of a HWD (i.e., glasses). FIG. 2 depicts the virtual image 150 and the modified-transmissivity zone 170 as would be observed by the eye 155 of a user of the optical system 200.

The projection surface 105 may be formed as an optical lens arranged in the frame 205 of the glasses. The light projector 135 may generate a virtual image 150 superimposed over at least a portion of a real-world view 210 visible through the projection surface 105. The stimulus source 160 may generate a modified-transmissivity zone 170 on the projection surface 105 according to some embodiments described herein. Although the light projector 135 and the stimulus source 160 are depicted in FIG. 2 as being arranged on a temple or hinge region of the frame 205, embodiments are not so limited. For instance, the light projector 135 and the stimulus source 160 may be arranged on any portion of the frame 205 capable of operating according to some embodiments described herein.

In some embodiments, the device optical system 200 may be configured to receive information of a location of and/or determine a location of the virtual image 150 overlaid on the projection surface 105 as viewed by the eye 155 of a user. For example, the control application may receive and/or determine virtual image location information that indicates an area of the projection surface 105 that is overlapped by the virtual image 150 from the perspective of the eye 155 of a user. The virtual image location information may be based on various information including, without limitation, eye gaze information, head position information, eye gaze location 185, a location of the projection zone 145, or a combination thereof.

In some embodiments, the modified-transmissivity zone 170 may be positioned on the projection surface 105 to correspond with the location of the virtual image 150 as viewed by the eye 155. In some embodiments, the virtual image 150 may be positioned to correspond with the location of the modified-transmissivity zone 170. For example, the modified-transmissivity zone 170 may be positioned on the projection surface 105 such that at least a portion of the virtual image 150 is overlaid on the modified-transmissivity zone 170 as visible to the eye 155. Accordingly, from the perspective of the eye 155 of the user, the modified-transmissivity zone 170 is arranged on the projection surface 105 such that the modified transmissivity zone 170 is behind the virtual image 150. In this manner, the light 140 incident on the eye 155 to generate the virtual image 150 is overlaid on the reduced-transmissivity internal ambient light (i.e., ambient light 124) that is incident on the eye 155 after passing through the reduced-transmissivity zone 170 to provide at least a portion of the image of the real-world view 210 (i.e., a reduced-transmissivity portion of the real-world view 210). As described according to some embodiments, the reduced-transmissivity internal ambient light (i.e., ambient light 124) has a reduced transmissivity as a result of passing through the reduced-transmissivity zone 170 as compared with the internal ambient light (i.e., ambient light 122) that passes through the non-modified zone 172.

In some embodiments, the modified-transmissivity zone 170 may be positioned on the projection surface 105 such that all or substantially all of the virtual image 150 is overlaid on the modified-transmissivity zone 170 (or the real-world view 210 formed from ambient light (i.e., ambient light 124) passing through the modified-transmissivity zone 170). In some embodiments, the modified-transmissivity zone 170 may be sized such that the modified-transmissivity zone 170 is larger than the virtual image 150 as visible to the eye 155. For example, as shown in FIG. 2, all of the virtual image 150 is overlaid on the modified-transmissivity zone 170 and at least a portion of the modified-transmissivity zone 170 extends beyond the virtual image 150. In some embodiments, the size of the modified-transmissivity zone 170 may be a specified amount larger than the virtual image 150. For example, the modified-transmissivity zone 170 may be a specified percentage larger than the virtual image 150. Non-limiting examples of a specified percentage may include 0.5%, 1%, 5%, 10%, 20%, 50%, 100%, and any value or range between any two of these values (including endpoints). In another example, For example, the modified-transmissivity zone 170 may be a specified distance larger than the virtual image 150 in one or more directions (e.g., the horizontal direction, the vertical direction, etc.). Non-limiting examples of a specified distance may include 0.1 mm, 0.25 mm, 0.5 mm, 1.0 mm, 2.0 mm, 5.0 mm, and any value or range between any two of these values (including endpoints).

Figure 3:
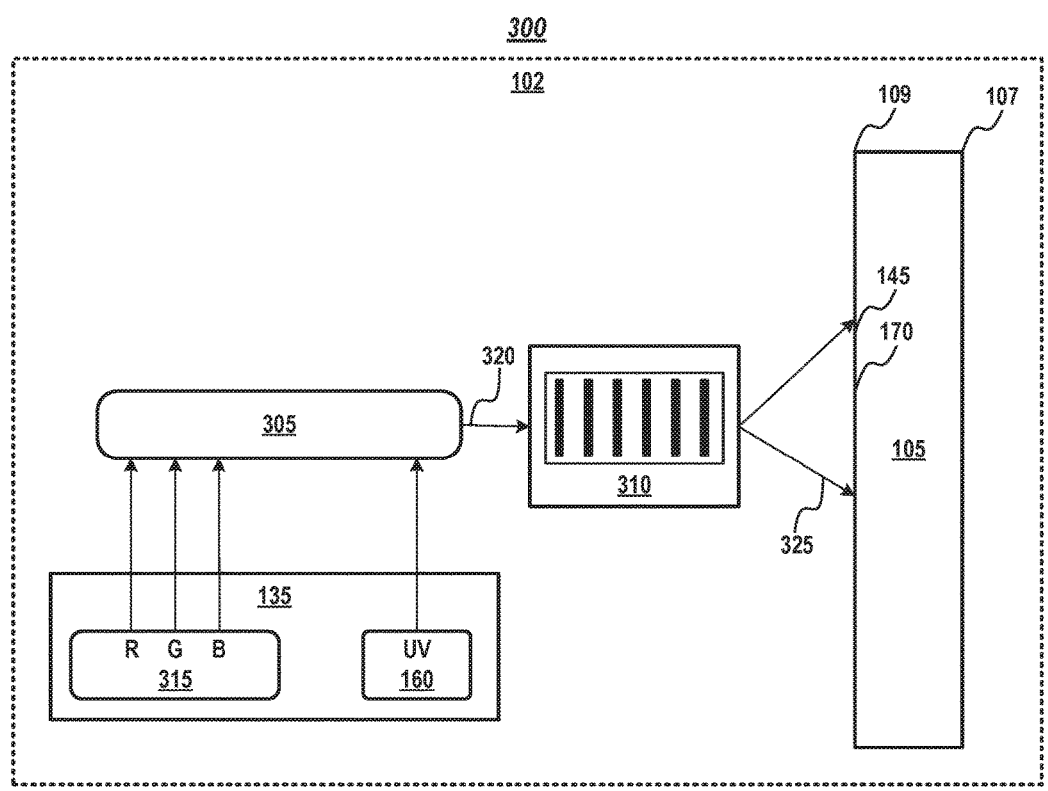
FIG. 3 depicts a block diagram of an illustrative virtual image projection system according to a third embodiment.

FIG. 3 depicts a block diagram of an illustrative virtual image projection system according to a third embodiment. More specifically, FIG. 3 illustrates an example optical system 300 for projecting a virtual image at a viewpoint according to some embodiments. As shown in FIG. 3, an optical system 300 may include a light source 135 having an RGB light element 315 for providing light for generating a virtual image. The light source 135 may also include a stimulus source 160 in the form of a UV light source. The UV light provided by the stimulus source may modify the transmissivity of a variable-transmissivity material of the projection surface 105. The optical system 300 may include an optical element 305 configured to receive the RGB light and/or the UV light from the light projector 135. The optical element 305 may be configured to shape, collimate, and/or otherwise combine the RGB light and/or the UV light into a combined light beam 320 for transmission to a projection optics element 310. The optical element 305 may contain various components for combining the RGB light and/or the UV light from the light projector 135 including, without limitation, mirrors, lenses, collimators, lasers, a combination thereof, or the like.

The projection optics element 310 may receive the combined light beam 320 from the optical element 305 and scan the combined light beam 320 as projected light 325 on a projection zone 145 of the projection surface 105 to generate a virtual image (not shown). The projection optics element 310 may contain various components for scanning the projected light 325 onto the projection surface 105, including, without limitation, mirrors, lenses, a MEMS-based projection system (e.g., a two-dimensional (2D) MEMS scanning mirror projection system), a matrix-based projection system (e.g., DLP), a combination thereof, and/or the like.

At least a portion of the RGB light in the projected light 325 scanned by the projection optics element 310 may reflect off of the projection surface 105 (or a holographic lens of the projection surface 105) to generate a virtual image. At least a portion of the UV light in the projected light 325 scanned by the projection optics element 310 may be incident on a variable-transmissivity material of the projection surface 105 to generate a modified-transmissivity zone 170.

FIG. 4A depicts a block diagram of illustrative projection surface according to a first embodiment and FIG. 4B depicts a block diagram of illustrative projection surface according to a second embodiment. As shown in FIGS. 4A-4B, in some embodiments, the projection surface 105 may include a plurality of layers. In some embodiments, the plurality of layers may include lenses, films, coatings, or the like. As shown in FIG. 4A, a projection surface 105 may include a variable-transmissivity layer 404, a light-directing layer 406, and an optical lens layer 402. In some embodiments, the variable-transmissivity layer 404 may be formed as an optical lens coated with and/or embedded with a variable-transmissivity material. In some embodiments, the variable-transmissivity layer 404 may be applied to the external side 107 of the projection surface 105 in order to only reduce the transmissivity of the external ambient light 120 entering the eye 155, while not reducing the brightness of the projected light 140 used to generate the virtual image 150.

As shown in FIG. 4B, a projection surface 105 may include a first optical lens layer 402a, a filter layer 408, a variable-transmissivity layer 404, a light-directing layer 406, and a second optical lens layer 402b. In some embodiments in which the stimulus for the variable-transmissivity layer 404 includes light in the spectrum of ambient light 120 (e.g., UV light), the filter layer 408 may filter out the stimulus light in order to prevent ambient light 120 from modifying the transmissivity of the variable-transmissivity layer 404. In some embodiments, the filter layer 408 may operate to filter UV light from the ambient light 120. In some embodiments, the filter layer 408 may operate to filter certain wavelengths of the ambient light 120 to change the color(s) of the internal ambient light 122.

Although FIGS. 4A-4B depict layers of the projection surface 105 in a particular topology, embodiments are not so limited, as the projection surface 105 may contain more or less layers and/or layers arranged in other topologies. In a first example, the projection surface 105 may include, in an order from the external side 107 to the internal side 109, a variable-transmissivity layer 404, a light-directing layer 406, and an optical lens layer 102. In a second example, the projection surface 105 may include, in an order from the external side 107 to the internal side 109, a variable-transmissivity layer 404 and a light-directing layer 406. In a third example, the projection surface 105 may include, in an order from the external side 107 to the internal side 109, an optical lens layer 102, a first variable-transmissivity layer 404, a second variable-transmissivity layer 404 having a variable-transmissivity material different than the first variable-transmissivity layer 404, a light-directing layer 406, and an optical lens layer 102. Embodiments are not limited in this context.

In addition, although FIGS. 4A-4B depict layers of the projection surface 105 as separate layers, embodiments are not so limited as the layers may include a first layer incorporated into a second layer. For example, the light directing layer 406 may be incorporated into an optical layer 402 (e.g., light directing optics incorporated into a polycarbonate layer). In another example, the variable-transmissivity layer 404 may be incorporated into a light directing layer 406 (e.g., a variable-transmissivity material may be incorporated into the material of the light directing layer 406). Embodiments are not limited in this context.

Figure 5:
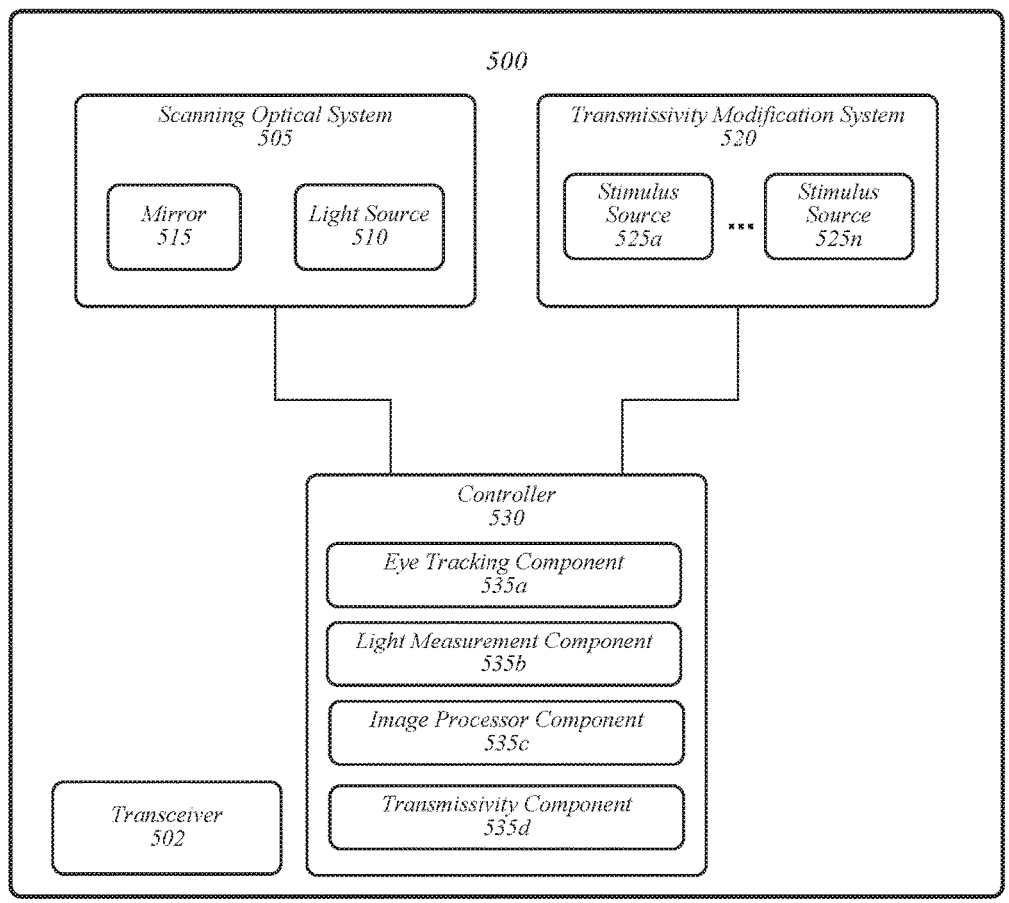
FIG. 5 depicts a block diagram of an illustrative virtual image projection system according to a fourth embodiment.

FIG. 5 depicts a block diagram of an illustrative virtual image projection system according to a fourth embodiment. More specifically, FIG. 5 depicts a block diagram of a virtual image projection system 500. In some examples, the virtual image projection system 500 may be implemented as the virtual image projection system 100, 200, and/or 300 described herein. In general, the virtual image projection system 500 may be provided to scan light over a projection surface (e.g., projection surface 105) to generate a virtual image according to some embodiments described herein.

In particular, the system 500 may include a scanning optical system 505. The scanning optical system 505 may include a light source 515 (e.g., a laser, an LED, or the like). Additionally, the scanning optical system 505 may include a mirror 510. The mirror 510 may be and/or include a MEMS-based mirror configured to scan light emitted from the light source 515 across a projection surface.

The scanning optical system 500 may include a transmissivity modification system 520 configured to modify the transmissivity of a projection surface used to generate a virtual image. The transmissivity modification system 520 may include at least one stimulus source 525a-n configured to apply a stimulus to a variable-transmissivity material of the projection surface.

The scanning optical system 500 may also include a controller 530. In general, the controller 530 may comprise hardware and/or software (e.g., a control application, a virtual image application or module, and/or a transmissivity application or module) and may be configured to execute instructions to cause the controller 530 to send information and/or one or more control signals to light source 510 and/or the mirror 515 to cause the light source 510 to emit light and the mirror 515 to rotate about a number of axes to scan the light over and/or across the projection surface. The controller may be configured to execute instructions to cause the controller 530 to send information and/or one or more control signals to the transmissivity modification system 520 to instruct a stimulus source 525a-n to apply a stimulus to a variable-transmissivity material of the projection surface.

The controller 530 may include an eye tracking component 535a. The eye tracking component 535a may include a camera, a combination of an LED, a vertical-cavity surface-emitting laser (VCSEL), a micro-LED, a resonant-cavity light emitting diode (RC-LED), a laser-based illumination source and a photo-sensor, such as a photodiode or an array of photodiodes, and/or the like. The eye tracking component 535a may be configured to track and/or determine a position or viewpoint of a user's eyes and/or head. In some embodiments, the eye tracking component 535a may be used to generate eye gaze information, head position information, and/or an eye gaze location (e.g., eye gaze location 185).

The controller 530 may include a light measurement component 535b. The light measurement component 535b may include one or more sensors configured to measure the brightness, intensity (e.g., luminous intensity), density, or other measurable characteristics of light. Non-limiting examples of sensors may include, without limitation, photoelectric sensors, cameras, light dependent resistors (LDR) (e.g., photodiodes and photoresistors), or the like. In some embodiments, the light measurement component 535b may operate to generate brightness information indicating a brightness (e.g., luminous intensity) of external ambient light and/or internal ambient light. In some embodiments, the light measurement component 535b may be configured to measure, indicate, or otherwise derive brightness differential information for external ambient light incident on a projection surface and/or internal ambient light directed toward a user (and potentially incident on the eye of the user). In some embodiments, the brightness differential information may indicate locations and/or amounts of non-uniform brightness of external ambient light and/or internal ambient light. For example, the brightness differential information may be used to indicate the brightness and/or differences in brightness of external ambient light incident on different areas of the projection surface and/or internal ambient light passing through the different areas of the projection surface. Accordingly, the scanning optical system 500 may use the brightness differential information to determine bright/dark areas of the projection surface and/or brightness variances on areas of the projection surface for generating modified-transmissivity zones.

The controller 530 may include an image processor component 535c. The image processor component 535c may be configured to use the scanning optical system 505 to generate virtual images. The image processor component 535c may include hardware and/or software configured to generate virtual images according to a virtual image application or module of a scanning optical system 500 control application. The image processor component 535c may be configured to receive, determine, or otherwise originate a source image to be displayed to a user of the scanning optical system 500. The image processor component 535c, for example, through controller 530, may control the transmission of light from a light source (e.g., light source 135) onto a projection surface (e.g., projection surface 105) to generate a virtual image of the source image visible to the user. The image processor component 535c may determine the type of light (e.g., the combination of red, blue, green, etc. light beams), the target location of the light (e.g., projection zone 145 and/or target locations of the scanned light beam(s) within the projection zone 145), angles of light projection, light scan duration, light intensity, and/or the like to generate the virtual image. The image processor component 535c may access information from one or more other components of the scanning optical system 500, such as the eye tracking component 535a, the light measurement component 535b, and/or the transmissivity component 535d. In some embodiments, the image processor component 535c may generate and/or receive image information associated with the virtual image (e.g., virtual image 155) including, without limitation, colors, size, location, brightness, object information, active/inactive status (e.g., a signal indicating a virtual image is being displayed, a signal that a virtual image is no longer being displayed, or the like), duration, or the like. In some embodiments, the scanning optical system 505 may receive and/or generate at least a portion of the image information. For instance, the scanning optical system 505 may provide image information relating to the creation of the virtual image to the controller 530, image processor component 535c, and/or transmissivity component 535d.

The controller 530 may include a transmissivity component 535d configured to generate one or more modified-transmissivity zones (e.g., modified-transmissivity zone 170) according to various embodiments. The transmissivity component 535d may operate to use the transmissivity modification system 520 to modify the transmissivity of a projection surface of the scanning optical system 500. The transmissivity component 535d may include hardware and/or software configured to modify the transmissivity of the projection surface according to a transmissivity application or module of a scanning optical system 500 control application.

The transmissivity component 535d may operate to instruct the transmissivity modification system 520 to apply a stimulus to the projection surface according to zone information. For example, the transmissivity component 535d may control a stimulus source to apply a stimulus to generate a modified-transmissivity zone on the projection surface at a location and having a size, duration, and/or color based on the zone information. In some embodiments, the transmissivity component 535d may receive information from various components, such as the eye tracking component 535a, the light measurement component 535b, and/or the image processor component 535c. The transmissivity component 535d may operate to generate a modified-transmissivity zone based on one or more factors, including, without limitation, ambient light brightness, eye gaze location, virtual image information, projection zone location, or the like. For example, the transmissivity component 535d may initiate the generation of a modified-transmissivity zone responsive to receiving virtual image information indicating a virtual image is being generated, and the transmissivity component 535d may stop the application of a stimulus to generate a modified-transmissivity zone responsive to receiving virtual image information indicating that the virtual image is no longer being generated. In another example, the transmissivity component 535d may modify one or more attributes of a modified-transmissivity zone responsive to virtual image information. For instance, the transmissivity component 535d may change the location, size, color, transmissivity reduction, or the like responsive to image information indicating a change in a corresponding property of a virtual image being presented to a user. In some embodiments, the transmissivity component 535d may dynamically and/or automatically modify properties of a modified-transmissivity zone based on information received from such as the eye tracking component 535a, the light measurement component 535b, and/or the image processor component 535c. For example, the location of a modified-transmissivity zone may be changed based on a change in the eye gaze location. In another example, the transmissivity reduction amount may be increased/decreased due to an increase/decrease in the brightness of ambient light. In a further example, properties of a modified-transmissivity zone may be modified responsive to changes in the virtual image. In a still further example, a plurality of modified-transmissivity zones may be generated responsive to image information indicating a plurality of virtual images are being projected to a user.

In some embodiments, the scanning optical system 500 and/or components thereof may receive information, instructions, or the like from one or more remote electronic devices. Non-limiting examples of electronic devices include, without limitation an ultra-mobile device, a mobile device, a personal digital assistant (PDA), a mobile computing device, a smart phone, a digital telephone, a cellular telephone, electronic readers (e.g., eBook readers, e-readers, etc.), a handset, a one-way pager, a two-way pager, a messaging device, a computer, a personal computer (PC), a desktop computer, a laptop computer, a notebook computer, a netbook computer, a handheld computer, a tablet computer, a server, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, a television, digital television, set top box, wireless access point, machine, or combination thereof.

The scanning optical system 500 may include one or more transceivers 502 for managing wired or wireless communication via one or more communication protocols between the scanning optical system 500 and the electronic devices. Non-limiting examples of communication protocols may include Bluetooth as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, an IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

For example, the image processor component 535c may receive data and/or instructions from a server, game system, or the like for generating a virtual image and/or a modified-transmissivity zone. In another example, the transmissivity component 535d may receive user input from a computing device (e.g., a smartphone) to turn on/off the generation of virtual images and/or modified-transmissivity zones.

Figure 6:
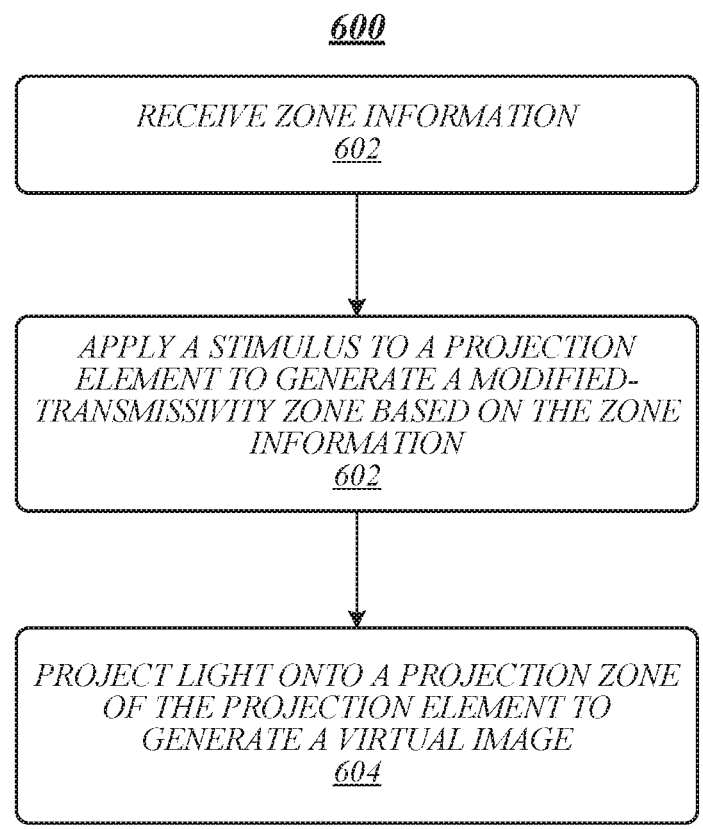
FIG. 6 depicts an illustrative logic flow according to a first embodiment.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 6 depicts an illustrative logic flow according to a first embodiment. More specifically, FIG. 6 illustrates one embodiment of a logic flow 600. The logic flow 600 may be representative of some or all of the operations executed by one or more embodiments described herein. For example, the logic flow 600 may illustrate operations performed by the virtual image projection system 100, virtual image projection system 200, virtual image projection system 300, and/or virtual image projection system 500.

In the illustrated embodiment shown in FIG. 6, the logic flow 600 may receive zone information at block 602. For example, the transmissivity component 535d may receive and/or generate zone information for specifying various properties of a modified-transmissivity zone including, without limitation, location, size, duration, transmissivity reduction, or the like. In one example, the transmissivity component 535d may generate zone information indicating a location and a size of a modified-transmissivity zone on a projection surface. In one example, the zone information may include a trigger to start/stop generating a particular modified-transmissivity zone. In some embodiments, at least a portion of the zone information may be generated based on image information indicating, for example, a location, size, color, or the like of a virtual image being or to be displayed to a user. The transmissivity component 535d may generate zone information to correspond with the virtual image, for instance, to ensure that the virtual image is superimposed over the modified-transmissivity zone. The transmissivity component 535d may process and/or transmit the zone information to the controller 530 for use by the virtual image projection system 500.

The logic flow 600 may apply a stimulus to a projection element to generate a modified-transmissivity zone based on the zone information at block 604. For example, the controller 530 may instruct a stimulus source 525a-n to apply a stimulus to at least a portion of a variable-transmissivity material of a projection surface (e.g., projection surface 105) to generate a modified-transmissivity zone (e.g., modified-transmissivity zone 170) on a portion of the projection surface. In some embodiments, the controller 530 instructions to the stimulus source 525a-n may be determined based on information and/or instructions from the transmissivity component 535d. Attributes of the modified-transmissivity zone may be based on the zone information. For instance, the location and size of the transmissivity zone may be specified by the zone information. The stimulus may operate to change a property of the variable-transmissivity material to modify the transmissivity of the portion of the projection surface within the modified-transmissivity zone.

For example, the stimulus may operate to change a color of the projection surface within the modified-transmissivity zone (e.g., from transparent to yellow). In another example, the stimulus may operate to reduce the transmissivity (e.g., tint, darken, or the like) of the projection surface, for instance, by 20% compared with a non-modified zone of the projection surface. The modified-transmissivity zone may be generated such that at least a portion of the virtual image is superimposed over at least a portion of the modified-transmissivity zone. Accordingly, the brightness of at least a portion of the ambient light (e.g., ambient light 124) that is incident on the eye (e.g., eye 155) to generate the real-world view (e.g., real-world view 210) behind the virtual image (e.g., virtual image 150) may be reduced or otherwise modified as compared with ambient light (e.g., ambient light 122) that does not pass through the modified-transmissivity zone.

The logic flow 600 may project light onto a projection zone of the projection element to generate a virtual image at block 606. For example, the controller 530 may instruct the scanning optical system 505 and/or elements thereof (e.g., light source 510 and/or mirror 515) to project light (e.g., light 140) onto a projection zone (e.g., projection zone 145) of a projection surface of the virtual image projection system 500 to generate a virtual image for observation by an eye of a user. In some embodiments, the controller 530 instructions to the scanning optical system 505 may be determined based on information and/or instructions from the image processor component 535c and/or the transmissivity component 535d. At least a portion of the virtual image may be superimposed over at least a portion of the modified-transmissivity zone.

Figure 7:
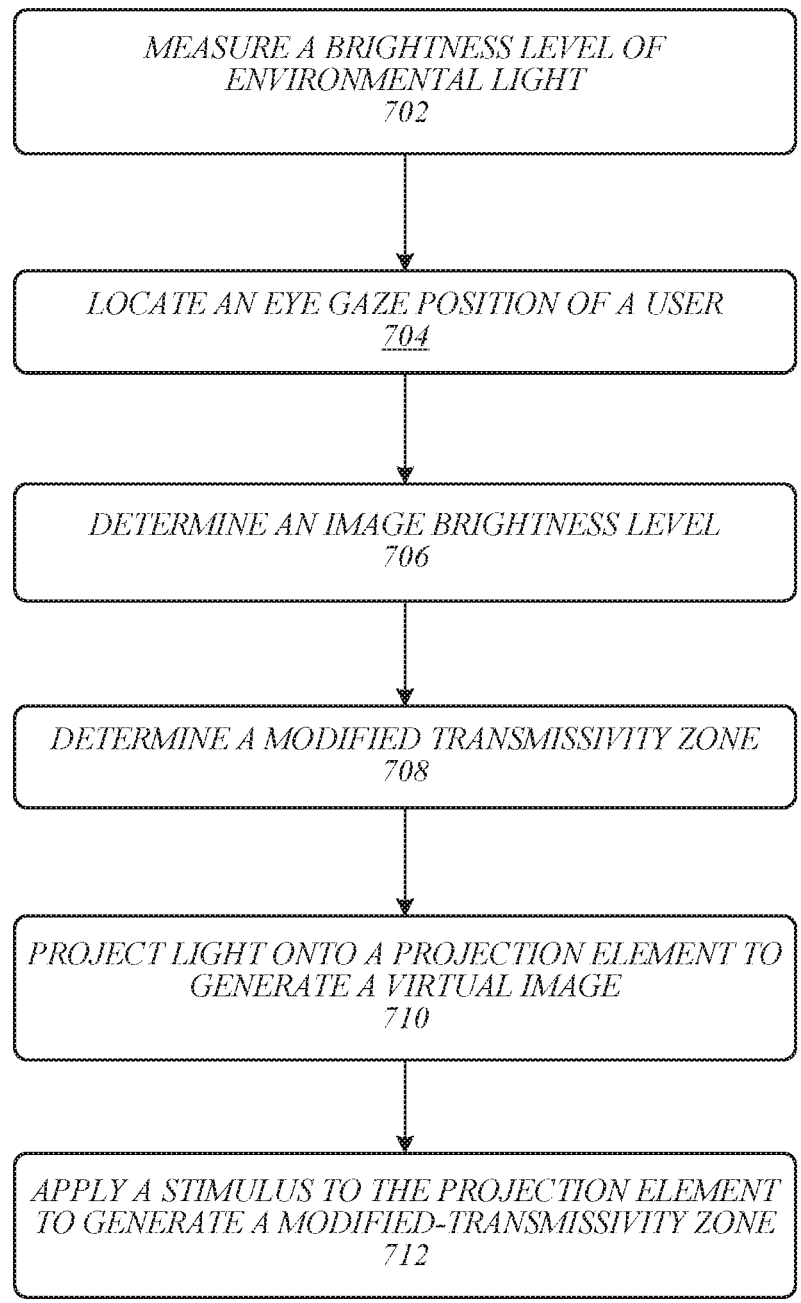
FIG. 7 depicts an illustrative logic flow according to a second embodiment.

FIG. 7 depicts an illustrative logic flow according to a second embodiment. More specifically, FIG. 7 illustrates one embodiment of a logic flow 700. The logic flow 700 may be representative of some or all of the operations executed by one or more embodiments described herein. For example, the logic flow 700 may illustrate operations performed by the virtual image projection system 100, virtual image projection system 200, virtual image projection system 300, and/or virtual image projection system 500.

In the illustrated embodiment shown in FIG. 7, the logic flow 700 may measure the brightness of environmental light at block 702. For example, the light measurement component 535b may receive information from one or more light sensors (e.g., light sensor 190). The light sensors may be configured to measure the amount, intensity, brightness, or the like of the ambient light (e.g., ambient light 120) external to the virtual image projection system 500 and/or the brightness of internal ambient light (e.g., ambient light 122, 124) that has passed through a projection surface of the virtual image projection system 500. The information from the light sensors may be used by the virtual image projection system 500 to generate brightness information and/or brightness differential information to provide the components of the virtual image projection system 500 with an indication of the brightness and/or the degree of non-uniform brightness of the external and/or internal ambient light.

The logic flow 700 may locate an eye gaze position of a user at block 704. For example, the eye tracking component 535a may receive information from one or more eye gaze trackers (e.g., eye gaze trackers 175) and/or head position trackers (e.g., head position tracker 180), such as eye gaze information and/or head position information. The eye tracking component 535a may use the eye gaze information and/or head position information to determine the location on a projection surface that is being looked at by a user (e.g., eye gaze location 185). In one example, the eye gaze location may be used to determine the placement location of a virtual image and/or modified transmissivity zone. In another example, the eye gaze location may be used to derive the brightness of ambient light being viewed by a user.

The logic flow 700 may determine an image brightness level of a virtual image at block 706. For example, the image processor component 535b may operate to determine a brightness level (e.g., luminous intensity) of one or more projected light beams (e.g., projected light 140) for generating the virtual image. In general, the image brightness level may be determined to ensure that a distinct, quality virtual image is visible to the user. In some embodiments, the brightness level may be determined, at least in part, based on the brightness of the external ambient light and/or internal ambient light. For instance, the image processor component 535b may increase the intensity of one or more projected light beams for brighter external ambient light and/or internal ambient light as compared to less-bright external ambient light and/or internal ambient light.

The logic flow 700 may determine a modified-transmissivity zone at block 706. For example, the transmissivity component 535d may receive and/or generate zone information for defining various attributes of a modified-transmissivity zone. The zone information may be based on various information, including, without limitation, the brightness information, the brightness differential information, the image information, the eye gaze location, or the like. In some embodiments, the transmissivity component 535d may process the brightness information, the brightness differential information, the image information, the eye gaze location, and/or the like to determine the appropriate zone information based on the environmental conditions, the anticipated virtual image, user preferences, or the like. In some embodiments, the zone information may be used by the controller 530 to generate instructions for the transmissivity modification system 520 to generate a modified-transmissivity zone having attributes specified by the zone information.

The logic flow 700 may project light onto a projection element to generate a virtual image at block 710. For example, the controller 530 may instruct the scanning optical system 505 and/or elements thereof (e.g., light source 510 and/or mirror 515) to project light (e.g., light 140) onto a projection zone (e.g., projection zone 145) of a projection surface of virtual image projection system 500 to generate a virtual image. The location of the projection zone may be determined based on the eye gaze location, for example, to locate the virtual image in a position visible to the user. For instance, the projection zone may be determined so that the projected light reflects off of the projection zone and is incident on the eye of the user to generate the virtual image. In some embodiments, various attributes of the projected light, including, without limitation, the intensity and/or the particular colors, may be selected based at least in part on the brightness information.

The logic flow 700 may apply a stimulus to the projection element to generate a modified-transmissivity zone at block 712. For example, the controller 530 may instruct a stimulus source 525a-n to apply a stimulus to at least a portion of a variable-transmissivity material of a projection surface (e.g., projection surface 105) to generate a modified-transmissivity zone (e.g., modified-transmissivity zone 170) on a portion of the projection surface. In one example, the projection surface may include an LCD layer configured to reduce the transmissivity of the projection surface responsive to the application of a current to the LCD layer. Various attributes of the modified-transmissivity zone may be determined based on the zone information. In some embodiments, the scanning optical system 505 and/or the image processor component 535c may send a signal, information, instructions or the like to the transmissivity component 535d indicating that a virtual image is being generated. Accordingly, the transmissivity component 535d may initiate the generation of a corresponding modified-transmissivity zone responsive to the signal, information, instructions, or the like. The modified-transmissivity zone may be located and/or sized such that at least a portion of the light incident on the eye to form the virtual image is superimposed over at least a portion of internal ambient light passing through the modified-transmissivity zone (i.e., the reduced-transmissivity light). Accordingly, at least a portion of the virtual image may be superimposed over at least a portion of the modified-transmissivity zone.

Figure 8:
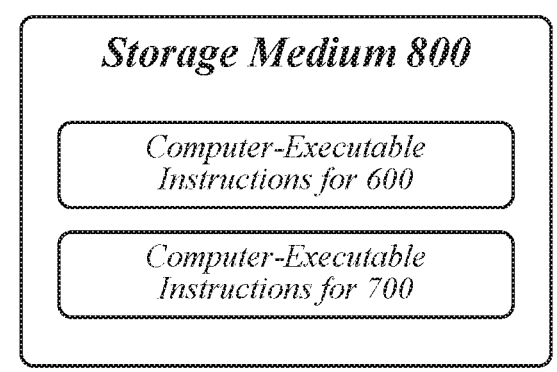
FIG. 8 depicts an illustrative computer readable medium according to an embodiment.

FIG. 8 depicts an illustrative computer readable medium according to an embodiment. More specifically, FIG. 8 illustrates an embodiment of a storage medium 800. The storage medium 800 may comprise an article of manufacture. In some examples, the storage medium 800 may include any non-transitory computer readable medium or machine readable medium, such as an optical, magnetic or semiconductor storage. The storage medium 800 may store various types of computer executable instructions. In some examples, the storage medium 800 may store various types of computer executable instructions to implement logic flow 600, logic flow 700, and/or variants thereof.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
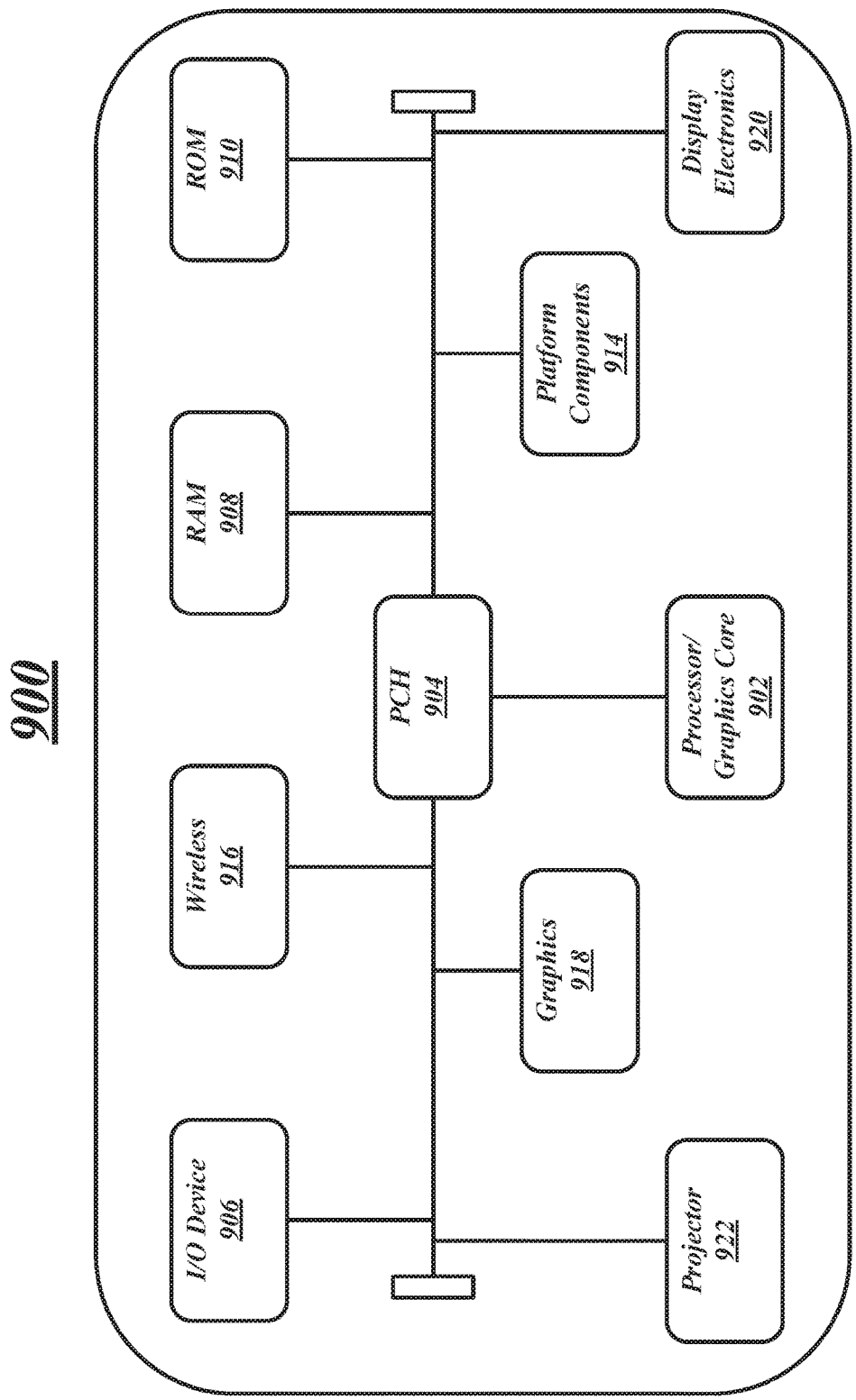
FIG. 9 depicts an illustrative device according to an embodiment.

FIG. 9 depicts an illustrative device according to an embodiment. More specifically, FIG. 9 is a diagram of an exemplary system embodiment and in particular, depicts a platform 900, which may include various elements. For instance, this figure depicts that platform (system) 900 may include a processor/graphics core 902, a chipset/platform control hub (PCH) 904, an input/output (I/O) device 906, a random access memory (RAM) (such as dynamic RAM (DRAM)) 908, and a read only memory (ROM) 910, display electronics 920, projector 922 (e.g., light projector 135), and various other platform components 914 (e.g., a fan, a cross flow blower, a heat sink, DTM system, cooling system, housing, vents, and/or the like). System 900 may also include wireless communications chip 916 and graphics device 918. The embodiments, however, are not limited to these elements.

As depicted, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting

Example 1

An apparatus, comprising: a projection surface comprising a variable-transmissivity material to modify a transmissivity of the projection surface to ambient light responsive to one or more stimuli being applied to the variable-transmissivity material; a projection unit to project light onto the projection surface to generate a virtual image; and one or more stimulus sources to apply the one or more stimuli to at least a portion of the variable-transmissivity material to generate one or more modified-transmissivity zones on the projection surface.

Example 2

The apparatus of example 1, the variable-transmissivity material comprising at least one of a photochromic material, an electrochromic material, and a thermochromic material.

Example 3

The apparatus of example 1, the variable-transmissivity material comprising a photochromic material, the photochromic material comprising at least one of silver, spiropyran, spirobenzopyran, benzopyran, naphthopyran, spiroxazine, fulgide, fulgimide, dithienylethene, azobenzene, azulene, stilbene, chromene, and diarylethene.

Example 4

The apparatus of example 1, the variable-transmissivity material comprising a photochromic material and the one or more stimuli comprising ultraviolet light.

Example 5

The apparatus of example 4, the projection surface comprising a filter layer to filter ultraviolet light from external ambient light.

Example 6

The apparatus of example 1, the variable-transmissivity material comprising a photochromic material and the one or more stimuli comprising a light beam of the light projected by the projection unit.

Example 7

The apparatus of example 6, the light beam comprising visible light.

Example 8

The apparatus of example 6, the light beam comprising at least one of red light, blue light, and green light.

Example 9

The apparatus of example 1, the variable-transmissivity material comprising a photochromic material and the one or more stimuli comprising infrared light.

Example 10

The apparatus of example 1, the variable-transmissivity material comprising an electrochromic material and the one or more stimulus sources comprising a laser.

Example 11

The apparatus of example 1, the variable-transmissivity material comprising a thermochromic material, the thermochromic material comprising at least one of leuco dyes, spirolactones, spiropyrans, fluorans, fulgides, thermochromic liquid crystals, cholesteryl nonanoate, and cyanobiphenyls.

Example 12

The apparatus of example 1, the variable-transmissivity material comprising an electrochromic material and the one or more stimuli comprising an electric signal.

Example 13

The apparatus of example 1, the variable-transmissivity material comprising an electrochromic material, the electrochromic material comprising at least one of a transition metal oxide, tungsten oxide, nickel oxide, polyaniline, pollythiophene, polyoxotungstate, polyoxometallate, a viologen, indium tin oxide, a metal hydride, metallohexacyanate, niobium pentoxide, molybdenum trioxide, Iridium oxide, metallophthalocyanine, metal hexacyanometallate, a liquid crystal material.

Example 14

The apparatus of example 1, the variable-transmissivity material comprising an electrochromic material, the electrochromic material comprising a liquid crystal display (LCD) material.

Example 15

The apparatus of example 1, the projection unit comprising a light projector.

Example 16

The apparatus of example 15, the light projector comprising at least one light source, the at least one light source comprising at least one of a laser light source and a light emitting diode (LED) light source.

Example 17

The apparatus of example 15, the light projector comprising a microelectromechanical system (MEMS).

Example 18

The apparatus of example 15, the light projector comprising a digital light processing (DLP) system.

Example 19

The apparatus of example 1, the one or more modified-transmissivity zones having a zone area that is less than a surface area of the projection surface.

Example 20

The apparatus of example 1, the modified-transmissivity zone being generated responsive to a brightness of ambient light being above a threshold value.

Example 21

The apparatus of example 1, the modified-transmissivity zone being generated responsive to a brightness differential of ambient light being above a threshold value.

Example 22

The apparatus of example 1, the modified-transmissivity zone comprising a zone location determined based on an eye gaze location.

Example 23

The apparatus of example 1, the projection surface comprising a plurality of variable-transmissivity materials, each of the plurality of variable-transmissivity materials to modify a transmissivity of the projection surface to ambient light responsive to a different stimulus.

Example 24

The apparatus of example 1, at least a portion of the virtual image being superimposed over at least a portion of the modified-transmissivity zone.

Example 25

The apparatus of example 1, the projection surface comprising an optical lens of a head-worn display.

Example 26

The apparatus of example 1, comprising a processor circuit operably connected to the one or more stimulus sources, the processor circuit to transmit instructions to the one or more stimulus sources to apply the one or more stimuli.

Example 27

The apparatus of example 26, comprising a transceiver operably connected to the processor circuit, at least a portion of the instructions formed based on data received via the transceiver.

Example 28

A method to project a virtual image superimposed over a real-world view, the method comprising: generating a modified-transmissivity zone by modifying a transmissivity of a projection surface to ambient light by applying one or more stimuli to at least a portion of a variable-transmissivity material of the projection surface; and projecting light onto the projection surface to generate a virtual image, at least a portion of the virtual image being superimposed over at least a portion of the modified-transmissivity zone.

Example 29

The method of example 28, the variable-transmissivity material comprising at least one of a photochromic material, an electrochromic material, and a thermochromic material.

Example 30

The method of example 28, the variable-transmissivity material comprising a photochromic material, the photochromic material comprising at least one of silver, spiropyran, spirobenzopyran, benzopyran, naphthopyran, spiroxazine, fulgide, fulgimide, dithienylethene, azobenzene, azulene, stilbene, chromene, and diarylethene.

Example 31

The method of example 28, the variable-transmissivity material comprising a photochromic material and the one or more stimuli comprising ultraviolet light.

Example 32

The method of example 31, the projection surface comprising a filter layer to filter ultraviolet light from external ambient light.

Example 33

The method of example 28, the variable-transmissivity material comprising a photochromic material and the one or more stimuli comprising a light beam of the light projected by the projection unit.

Example 34

The method of example 33, the light beam comprising visible light.

Example 35

The method of example 33, the light beam comprising at least one of red light, blue light, and green light.

Example 36

The method of example 28, the variable-transmissivity material comprising a photochromic material and the one or more stimuli comprising infrared light.

Example 37

The method of example 28, the variable-transmissivity material comprising an electrochromic material and the one or more stimulus sources comprising a laser.

Example 38

The method of example 28, the variable-transmissivity material comprising a thermochromic material, the thermochromic material comprising at least one of leuco dyes, spirolactones, spiropyrans, fluorans, fulgides, thermochromic liquid crystals, cholesteryl nonanoate, and cyanobiphenyls.

Example 39

The method of example 28, the variable-transmissivity material comprising an electrochromic material and the one or more stimuli comprising an electric signal.

Example 40

The method of example 28, the variable-transmissivity material comprising an electrochromic material, the electrochromic material comprising at least one of a transition metal oxide, tungsten oxide, nickel oxide, polyaniline, pollythiophene, polyoxotungstate, polyoxometallate, a viologen, indium tin oxide, a metal hydride, metallohexacyanate, niobium pentoxide, molybdenum trioxide, Iridium oxide, metallophthalocyanine, metal hexacyanometallate, a liquid crystal material.

Example 41

The method of example 28, the variable-transmissivity material comprising an electrochromic material, the electrochromic material comprising a liquid crystal display (LCD) material.

Example 42

The method of example 28, the projection unit comprising a light projector.

Example 43

The method of example 42, the light projector comprising at least one light source, the at least one light source comprising at least one of a laser light source and a light emitting diode (LED) light source.

Example 44

The method of example 43, the light projector comprising a microelectromechanical system (MEMS).

Example 45

The method of example 43, the light projector comprising a digital light processing (DLP) system.

Example 46

The method of example 28, the one or more modified-transmissivity zones having a zone area that is less than a surface area of the projection surface.

Example 47

The method of example 28, the modified-transmissivity zone being generated responsive to a brightness of ambient light being above a threshold value.

Example 48

The method of example 28, the modified-transmissivity zone being generated responsive to a brightness differential of ambient light being above a threshold value.

Example 49

The method of example 28, the modified-transmissivity zone comprising a zone location determined based on an eye gaze location.

Example 50

The method of example 28, the projection surface comprising a plurality of variable-transmissivity materials, each of the plurality of variable-transmissivity materials to modify a transmissivity of the projection surface to ambient light responsive to a different stimulus.

Example 51

The method of example 28, at least a portion of the virtual image being superimposed over at least a portion of the modified-transmissivity zone.

Example 52

The method of example 28, the projection surface comprising an optical lens of a head-worn display.

Example 53

An apparatus, comprising means for performing a method to project a virtual image superimposed over a real-world view according to any of examples 28 to 52.

Example 54

A system, comprising: the apparatus of example 1; and at least one processor circuit.

Example 55

The system of example 54, comprising at least one transceiver operably connected to the at least one processor circuit.

Example 56

The system of any of examples 54 to 55, comprising a plurality of projection surfaces.

Example 57

A heads-up display device, comprising: a projection surface comprising a variable-transmissivity material to modify a transmissivity of the projection surface to ambient light responsive to one or more stimuli being applied to the variable-transmissivity material; a projection unit to project light onto the projection surface to generate a virtual image superimposed onto a real-world view; one or more stimulus sources to apply the one or more stimuli to at least a portion of the variable-transmissivity material; and logic, at least partially implemented in hardware, the logic to: receive zone information comprising at least one property of a modified-transmissivity zone, and control the one or more stimulus sources to apply the one or more stimuli to generate the modified-transmissivity zone based on the zone information.

Example 58

The heads-up display device of example 57, the zone information comprising a location and a size of the modified-transmissivity zone.

Example 59

The heads-up display device of example 57, the logic to generate the modified-transmissivity responsive to a brightness of ambient light being above a threshold value.

Example 60

The heads-up display device of example 57, the logic to generate the modified-transmissivity responsive to a brightness differential of ambient light being above a threshold value.

Example 61

The heads-up display device of example 57, the logic to generate the modified-transmissivity at a zone location determined based on an eye gaze location.

Example 62

The heads-up display device of example 57, the variable-transmissivity material comprising at least one of a photochromic material, an electrochromic material, and a thermochromic material.

Example 63

The heads-up display device of example 57, the variable-transmissivity material comprising a photochromic material, the photochromic material comprising at least one of silver, spiropyran, spirobenzopyran, benzopyran, naphthopyran, spiroxazine, fulgide, fulgimide, dithienylethene, azobenzene, azulene, stilbene, chromene, and diarylethene.

Example 64

The heads-up display device of example 57, the variable-transmissivity material comprising a photochromic material and the one or more stimuli comprising ultraviolet light.

Example 65

The heads-up display device of example 64, the projection surface comprising a filter layer to filter ultraviolet light from external ambient light.

Example 66

The heads-up display device of example 57, the variable-transmissivity material comprising a photochromic material and the one or more stimuli comprising a light beam of the light projected by the projection unit.

Example 67

The heads-up display device of example 66, the light beam comprising visible light.

Example 68

The heads-up display device of example 66, the light beam comprising at least one of red light, blue light, and green light.

Example 69

The heads-up display device of example 57, the variable-transmissivity material comprising a photochromic material and the one or more stimuli comprising infrared light.

Example 70

The heads-up display device of example 57, the variable-transmissivity material comprising an electrochromic material and the one or more stimulus sources comprising a laser.

Example 71

The heads-up display device of example 57, the variable-transmissivity material comprising a thermochromic material, the thermochromic material comprising at least one of leuco dyes, spirolactones, spiropyrans, fluorans, fulgides, thermochromic liquid crystals, cholesteryl nonanoate, and cyanobiphenyls.

Example 72

The heads-up display device of example 57, the variable-transmissivity material comprising an electrochromic material and the one or more stimuli comprising an electric signal.

Example 73

The heads-up display device of example 57, the variable-transmissivity material comprising an electrochromic material, the electrochromic material comprising at least one of a transition metal oxide, tungsten oxide, nickel oxide, polyaniline, pollythiophene, polyoxotungstate, polyoxometallate, a viologen, indium tin oxide, a metal hydride, metallohexacyanate, niobium pentoxide, molybdenum trioxide, Iridium oxide, metallophthalocyanine, metal hexacyanometallate, a liquid crystal material.

Example 74

The heads-up display device of example 57, the variable-transmissivity material comprising an electrochromic material, the electrochromic material comprising a liquid crystal display (LCD) material.

Example 75

The heads-up display device of example 57, the projection unit comprising a light projector.

Example 76

The heads-up display device of example 75, the light projector comprising at least one light source, the at least one light source comprising at least one of a laser light source and a light emitting diode (LED) light source.

Example 77

The heads-up display device of example 75, the light projector comprising a microelectromechanical system (MEMS).

Example 78

The heads-up display device of example 75, the light projector comprising a digital light processing (DLP) system.

Example 79

The heads-up display device of example 57, the one or more modified-transmissivity zones having a zone area that is less than a surface area of the projection surface.

Example 80

The heads-up display device of example 57, the modified-transmissivity zone being generated responsive to a brightness of ambient light being above a threshold value.

Example 81

The heads-up display device of example 57, the modified-transmissivity zone being generated responsive to a brightness differential of ambient light being above a threshold value.

Example 82

The heads-up display device of example 57, the modified-transmissivity zone comprising a zone location determined based on an eye gaze location.

Example 83

The heads-up display device of example 57, the projection surface comprising a plurality of variable-transmissivity materials, each of the plurality of variable-transmissivity materials to modify a transmissivity of the projection surface to ambient light responsive to a different stimulus.

Example 84

The heads-up display device of example 57, at least a portion of the virtual image being superimposed over at least a portion of the modified-transmissivity zone.

Example 85

At least one machine-readable storage medium comprising a plurality of instructions that in response to being executed on a computing device, cause the computing device to: generate a modified-transmissivity zone by modifying a transmissivity of a projection surface to ambient light by applying one or more stimuli to at least a portion of a variable-transmissivity material of the projection surface; and project light onto the projection surface to generate a virtual image, at least a portion of the virtual image being superimposed over at least a portion of the modified-transmissivity zone Example 86

The least one machine-readable storage medium of example 85, the plurality of instructions, in response to being executed on a computing device, cause the computing device to receive zone information comprising at least one property of the modified-transmissivity zone.

Example 87

The least one machine-readable storage medium of example 85, the zone information comprising a location and a size of the modified-transmissivity zone.

Example 88

The least one machine-readable storage medium of example 85, the plurality of instructions, in response to being executed on a computing device, cause the computing device to generate the modified-transmissivity responsive to a brightness of ambient light being above a threshold value.

Example 89

The least one machine-readable storage medium of example 85, the plurality of instructions, in response to being executed on a computing device, cause the computing device to generate the modified-transmissivity responsive to a brightness differential of ambient light being above a threshold value.

Example 90

The least one machine-readable storage medium of example 85, the plurality of instructions, in response to being executed on a computing device, cause the computing device to generate the modified-transmissivity at a zone location determined based on an eye gaze location.

Example 91

An apparatus, comprising: a projection means to project a virtual image; a variable-transmissivity means to modify a transmissivity of the apparatus to ambient light responsive to one or more stimuli; a projection means to project light to generate the virtual image; and a stimulus means to apply the one or more stimuli to generate one or more modified-transmissivity zones.

Example 92

The apparatus of example 91, the stimulus means to apply the one or more stimuli to generate one or more modified-transmissivity zones responsive to a brightness of ambient light being above a threshold value.

Example 93

The apparatus of example 91, the stimulus means to apply the one or more stimuli to generate one or more modified-transmissivity zones responsive to a brightness differential of ambient light being above a threshold value.

Example 94

The apparatus of example 91, comprising a transceiver means for receiving zone information.

Example 95

The apparatus of example 94, receive zone information comprising at least one property of the modified-transmissivity zone.

Example 96

The apparatus of example 94, the stimulus means to apply the one or more stimuli to generate one or more modified-transmissivity zones based on the zone information.

Example 97

The apparatus of example 91, the projection means to generate the virtual image superimposed over at least a portion of the one or more modified-transmissivity zones.

What is claimed is:
1. An apparatus, comprising:
  a projection surface comprising a variable-transmissivity material to modify a transmissivity of the projection surface to ambient light responsive to one or more stimuli being applied to the variable-transmissivity material;
  a projection unit to project light onto the projection surface to generate a virtual image superimposed onto a real-world view; and
  one or more stimulus sources to apply the one or more stimuli to at least a portion of the variable-transmissivity material to generate one or more modified-transmissivity zones on the projection surface, the one or more modified transmissivity zones located on the projection surface based on an eye gaze location associated with a user of the apparatus.

2. The apparatus of claim 1, the variable-transmissivity material comprising at least one of a photochromic material, an electrochromic material, and a thermochromic material.

3. The apparatus of claim 1, the variable-transmissivity material comprising a photochromic material and the one or more stimuli comprising ultraviolet light.

4. The apparatus of claim 3, the projection surface comprising a filter layer to filter ultraviolet light from external ambient light.

5. The apparatus of claim 1, the variable-transmissivity material comprising a photochromic material and the one or more stimuli comprising a light beam of the light projected by the projection unit.

6. The apparatus of claim 1, the variable-transmissivity material comprising an electrochromic material and the one or more stimuli comprising an electric signal.

7. The apparatus of claim 1, the one or more modified-transmissivity zones having a zone area that is less than a surface area of the projection surface.

8. The apparatus of claim 1, the modified-transmissivity zone being generated responsive to a brightness of ambient light being above a threshold value.

9. The apparatus of claim 1, the modified-transmissivity zone being generated responsive to a brightness differential of ambient light being above a threshold value.

10. The apparatus of claim 1, the projection surface comprising a plurality of variable-transmissivity materials, each of the plurality of variable-transmissivity materials to modify a transmissivity of the projection surface to ambient light responsive to a different stimulus.

11. The apparatus of claim 1, at least a portion of the virtual image being superimposed over at least a portion of the modified-transmissivity zone.

12. A method to project a virtual image superimposed over a real-world view, the method comprising:
  generating a modified-transmissivity zone by modifying a transmissivity of a projection surface to ambient light by applying one or more stimuli to at least a portion of a variable-transmissivity material of the projection surface, the modified-transmissivity zone located on the projection surface based on an eye gaze location associated with a user of the apparatus; and
  projecting, by a projection unit, light onto the projection surface to generate a virtual image superimposed onto a real-world view, at least a portion of the virtual image being superimposed over at least a portion of the modified-transmissivity zone.

13. The method of claim 12, the variable-transmissivity material comprising a photochromic material and the one or more stimuli comprising ultraviolet light.

14. The method of claim 13, the projection surface comprising a filter layer to filter ultraviolet light from external ambient light.

15. The method of claim 12, the variable-transmissivity material comprising a photochromic material and the one or more stimuli comprising a light beam of the light projected by the projection unit.

16. The method of claim 12, the variable-transmissivity material comprising an electrochromic material and the one or more stimuli comprising an electric signal.

17. The method of claim 12, the one or more modified-transmissivity zones having a zone area that is less than a surface area of the projection surface.

18. The method of claim 12, the modified-transmissivity zone being generated responsive to a brightness of ambient light being above a threshold value.

19. The method of claim 12, the modified-transmissivity zone being generated responsive to a brightness differential of ambient light being above a threshold value.

20. A heads-up display device, comprising:
   a projection surface comprising a variable-transmissivity material to modify a transmissivity of the projection surface to ambient light responsive to one or more stimuli being applied to the variable-transmissivity material;
   a projection unit to project light onto the projection surface to generate a virtual image superimposed onto a real-world view;
   one or more stimulus sources to apply the one or more stimuli to at least a portion of the variable-transmissivity material; and
   logic, at least partially implemented in hardware, the logic to:
      receive zone information comprising at least one property of a modified-transmissivity zone, and
      control the one or more stimulus sources to apply the one or more stimuli to generate the modified-transmissivity zone based on the zone information.

21. The heads-up display device of claim 20, the zone information comprising a location and a size of the modified-transmissivity zone.

22. The heads-up display device of claim 20, the logic to generate the modified-transmissivity responsive to a brightness of ambient light being above a threshold value.

23. The heads-up display device of claim 20, the logic to generate the modified-transmissivity responsive to a brightness differential of ambient light being above a threshold value.

24. The heads-up display device of claim 20, the logic to generate the modified-transmissivity at a zone location determined based on an eye gaze location.

* * * * *